United States Patent [19]

Daniell et al.

[11] 4,432,057
[45] Feb. 14, 1984

[54] METHOD FOR THE DYNAMIC REPLICATION OF DATA UNDER DISTRIBUTED SYSTEM CONTROL TO CONTROL UTILIZATION OF RESOURCES IN A MULTIPROCESSING, DISTRIBUTED DATA BASE SYSTEM

[75] Inventors: Thomas P. Daniell, Palo Alto; Robert C. Harding, Jr., Cupertino; Neil J. Lewis, Oakland; Sven H. H. Nauckhoff, San Jose, all of Calif.

[73] Assignee: International Business Machines Corporation, Armonk, N.Y.

[21] Appl. No.: 325,531

[22] Filed: Nov. 27, 1981

[51] Int. Cl.$^3$ ............................................. G06F 9/00
[52] U.S. Cl. .................................... 364/300; 364/200
[58] Field of Search ......................................... 364/300

[56] References Cited

U.S. PATENT DOCUMENTS 4,007,450  2/1977  Haibt et al. .................... 340/172.5
4,344,134  8/1982  Barnes ................................ 364/200

OTHER PUBLICATIONS

Bernstein, "The Concurrency Control Mechanism of SDD-1: A System for Distributed Databases (The Fully Redundant case)", reprinted in W. W. Chu et al., *Tutorial: Centralized and Distributed Data Base Systems*, IEEE Computer Society, Presented Oct. 1–4, 1979, "Chapter 12. Synchronization and Concurrency Control of Multiple Copy Data Bases", at p. 516.

Ellis, "A Robust Algorithm for Updating Duplicate Data Bases", reprinted in W. W. Chu et al., supra, at p. 531.

Lewis, "A Distributed Data Control System", an unpublished, internal IBM memorandum; time stamped Oct. 24, 1978.

*Primary Examiner*—Raulfe B. Zache
*Attorney, Agent, or Firm*—Shelley M. Beckstrand

[57] ABSTRACT

A method for dynamic replication of data under distributed system control to control the utilization of resources in a multiprocessing, distributed data base system. Previously, systems providing for data replication at nodes of a multiprocessing, distributed data base system required that a central node maintain control, or that replicated data be synchronized by immediately conforming all copies of an updated data item. By this invention, requests for access to data of a specified currency are permitted and conformation of updated data is selectively deferred by use of a control procedure implemented at each node and utilizing a status and control (SAC) filed at each node which describes that node's view of the status for shared data items at other nodes.

12 Claims, 9 Drawing Figures

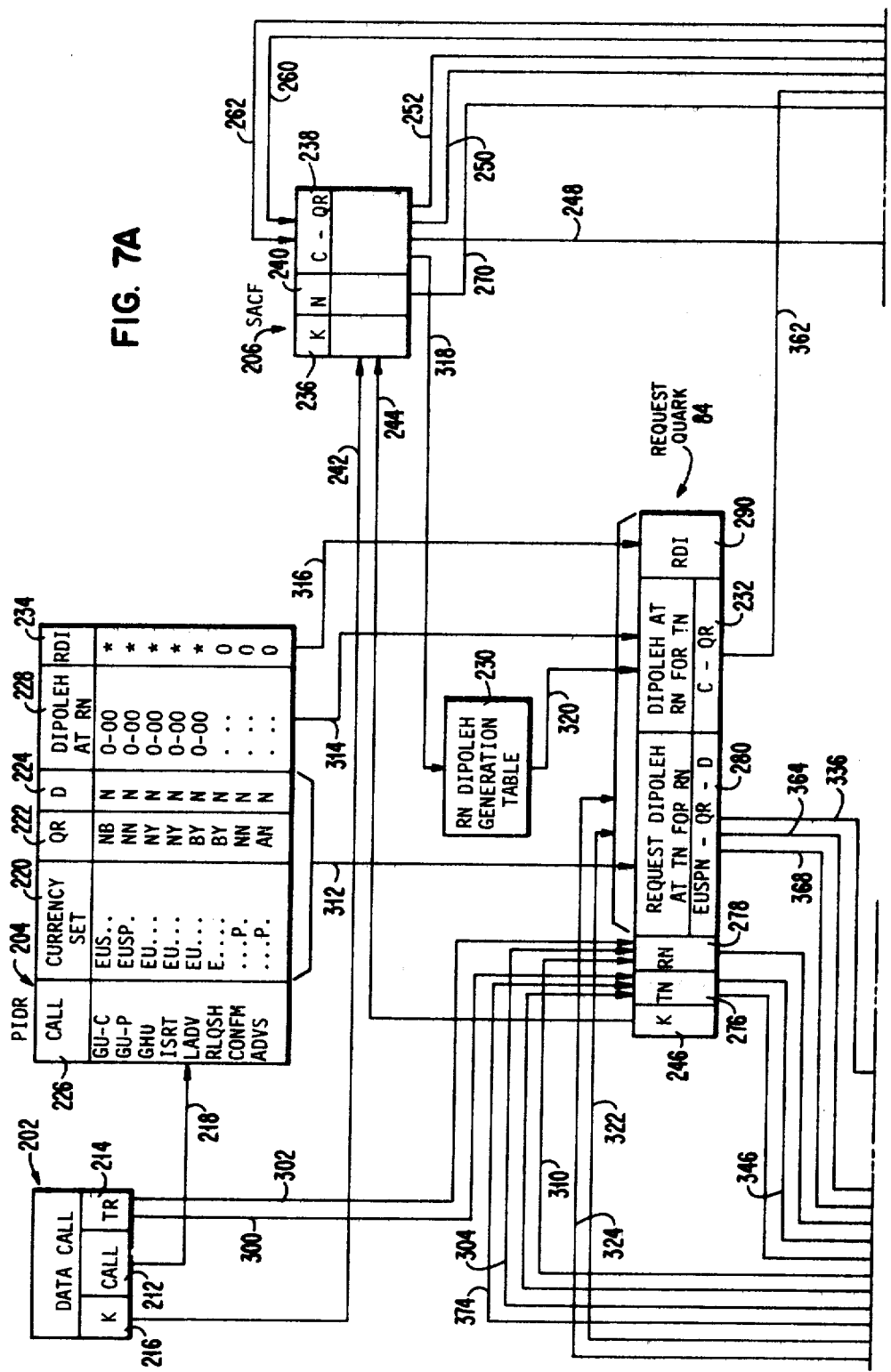

METHOD FOR THE DYNAMIC REPLICATION OF DATA UNDER DISTRIBUTED SYSTEM CONTROL TO CONTROL UTILIZATION OF RESOURCES IN A MULTIPROCESSING, DISTRIBUTED DATA BASE SYSTEM

BACKGROUND OF INVENTION

1. Field of the Invention

This invention relates to new and useful improvements in methods of operating general purpose digital computing systems. More specifically, it relates to a method for utilizing data storage and communication resources in a multiprocessing, distributed data base system by dynamically replicating data under distributed system control.

2. Description of the Prior Art

A multiprocessing general purpose computing system typically includes a plurality of nodes interconnected by a communication network. Each node, in such a system, may include a data processor, a data storage device, and communication ports. A data processor may be executing, in a multiprogramming mode, under control of a plurality of operating system components, in which event the data processor may be considered a plurality of nodes. The data storage device stores a data file, the operating system and its information management components, and user application programs.

Data is information abstracted from some aspect of business important to an enterprise. The challenge is to utilize data storage and communication resources of the system so as to give end users access to the data with an availability, performance, and cost commensurate with their business needs. Access to the data must be controlled to ensure the consistency and integrity of the data. Among additional characteristics of data accesses in a distributed data processing environment are geographic and temporal affinity. The basis for distributed data structures is geographic affinity: accesses to a given data item tend to cluster geographically. A basis for the method for dynamic replication of data is temporal affinity: data items which have been accessed recently may be more likely to be accessed in the near future than data items not recently accessed. The node at which accesses for a given data item tend to cluster is called the affinity node; the affinity node for a given data item may not be known ahead of time, and it may vary with time.

Distributed data technology may be categorized according to the attributes of data location, degree of data sharing, degree to which data base management control is provided network-wide, and to the type of data access. Data location may be centralized, partitioned, or replicated. Degree of data sharing may be centralized, decentralized, or distributed. Data base management control may be user provided (distributed data) or system provided (distributed data base). Data access may be by transaction shipping, function shipping, or data shipping.

Historically, a centralized approach has been used for managing data base storage and accesses. In this approach, both data management and application processing are centralized. A single data base manager is used, and the teleprocessing network is used to connect users to the central facility. In a variation on the centralized approach, some of the processing is distributed among nodes in a network, but the data is kept centralized.

The advantages of a centralized data base approach are that (1) data base integrity can be ensured by the single data base manager; (2) all application programs can be written to a single application programming interface: application programs need not be aware of data location since all data is stored in one location; (3) many tools are available to solve the problems of administering data in the centralized environment; and (4) a single system is easier to operate, maintain and control.

Some disadvantages to the centralized approach are: (1) communication costs are high for some enterprises: application performance may be degraded due to communication delays; (2) data availability may be poor due to instability in the teleprocessing network or the central system, which may have to be mitigated by backup systems and redundant communication; and (3) the processing capabilities of a single system have already been reached by some enterprises.

Two approaches for distributing data to the nodes of a distributed data system are (1) partitioning and (2) static replication. In the partitioned data approach there is no primary copy of the data base, whereas there may be in static replication.

A partitioned data base approach divides the data base into distinct partitions, and the partitions are spread among the nodes. A given data item resides at only one node location. Each location has a data base manager which manages the data at its location. A data distribution manager takes a data request from an application program and maps it to a local request, if the data is held locally, or to a remote request if the data is held at another location.

Good data availability and access performance result in a partitioned distributed data base if the data required is held locally. Furthermore, data base integrity is facilitated since each data item is managed by a single data base manager. These results may be achieved if a good partitioning algorithm exists, is known ahead of time, and is stable.

In a partitioned data base, the system must provide a network-wide scope of recovery for programs which change data at more than one location.

Among the disadvantages of a partitioned data base system are (1) reduced availability and performance result if the partitioning algorithm does not match the data access patterns; (2) the application program may have to be aware of the data location, or at least the data partitioning algorithm, and access the data base differently, depending upon data location; (3) changing the data base partitioning algorithm is very difficult because data location is reflected in the application programs, exits, or declarations at each node; (4) existing data relocation and algorithm changes at each node must be synchronized network-wide, and therefore the partitioning algorithm may not be adjusted as needed to maintain optimum performance and availability; and (5) programs which access data items uniformly across a partitioned data base, or which must access the entire data base, will suffer poor performance and availability.

Static replication techniques for distributing data include those with and without a central node. In the former, the central location stores a primary copy of the data base, and each location has a data base manager and a copy of the data base. In typical uses of static replication, the primary data base is copied and sent to each replica location, or node, where the data then becomes available for local processing. Data modifications made at each replica location are collected for later processing against the primary data base. Between periods of application processing, local modifications are sent to the central location and applied against the primary data base. Because this technique for managing replicated data bases does nothing to prevent multiple updates, the occurrence of such must be detected during primary data base update and resolved manually; otherwise, the application must be restricted so that, somehow, multiple updates do not occur. After the primary data base has been made to conform to replica changes, new copies are sent to the replica locations, and the whole process starts over again.

The main advantage of static replication with a primary copy at a central location is high availability and good response time since all data is locally accessible. However, significant disadvantages exist, among them: (1) because the system does not prevent multiple updates, data base integrity is difficult to ensure, severly restricting the data base processing which is feasible for static replicas; (2) the system does not ensure current data for application accesses requiring such; (3) special operational procedures are required for collecting and applying replica modifications to the primary data base, which can be costly and prone to error: typically, primary data base conformation occurs in the middle of the night, and since this is when problems are most likely to be encountered, key personnel must be available; and (4) the data base may not be available during the conformation procedure: providing a large enough window for conformation is not feasible in many applications, the data transmission bandwidth may be unnecessarily large because updates and replicas are transmitted only during the narrow window between periods of operation, and if one or more of the nodes is incapacitated, then conformation may not be possible in the scheduled window.

Many variations have been described in the literature with respect to the basic techniques of static replication described above. The application can be designed so that multiple updates do not occur, or the replicas can be limited to read accesses only. The application program can collect updates itself for later transmission to the primary location, or this information can be gleaned from data base manager logs. Full replicas or only partial replicas can be formed at the replica locations. The entire replica data base or only changes to data held can be transmitted. Replicas can be continually synchronized by sending modifications made by a transaction to the various nodes and receiving acknowledgments as part of transaction termination processing. Such techniques of synchronization may solve the integrity problems of static replication, but lose much of the performance and availability benefits.

U.S. Pat. No. 4,007,450 by Haibt describes a distributed data control system where each node shares certain of its data sets in common with other nodes, there being no primary copy at a central location, but replicas are continually synchronized. Each node is operative to update any shared data set unless one of the other nodes is also seeking to update, in which event the node with the higher priority prevails. Each node stores in its memory the node location of each shared data set and the updating priority each node has with respect to each respective set of shared data. When a data set is updated at a node, all nodes having a replica are sent the update. As above, such a technique solves the integrity problems of static replication, but loses much of the performance and availability benefits.

A method for utilizing data storage and communication resources in a distributed data base system is needed which avoids the disadvantages while maintaining the advantages of the central, partitioned, and static replication techniques: (1) high availability and performance for data which is held at the node where it is accessed; (2) high availability and performance for application programs that can accept data which is possibly not the most current; (3) data location transparency, such that application programmers and end users need not be aware of data location or even of a data partitioning algorithm and the data base appears the same as in the single system, or central, approach; (4) data automatically migrates to the locations where it is accessed without the need for a partitioning algorithm; (5) good performance for programs which access the data base uniformly: a given node can be made to have a copy of every data item in the data base, but it need not be the most current; (6) no special update procedures or windows required, but rather are managed network-wide by the system; (7) data base integrity, with multiple updates prevented and application programs receiving data as current as they require; and (8) the teleprocessing network can be unstable, with the control not requiring that communication with all or any other node be available to access data held locally.

SUMMARY OF THE INVENTION

The invention provides a method for operating a computing system including a plurality of nodes, with each node having means for storing at least one data item, characterized by the steps of accepting a request having a specified currency, and responsive thereto dynamically replicating data under distributed system control while selectively deferring conformation of the replicated data.

This invention further provides a new and useful method for operating a multiprocessing system including a communication network interconnecting a plurality of data processing nodes accessing a distributed data base, the method including the steps of storing unique and replicated data items at a plurality of nodes, and responsive to a request by an application at this node enabling access by the application to the copy of a data item stored at this node, and communicating copies of updated data items to other nodes; wherein the improvement controls utilization of data storage and communication resources to enhance data access performance and ensure network-wide data consistency and integrity where accesses to data may have time varying and a priori unknown geographic and temporal affinity and wherein the communication network may be unstable, by dynamically replicating data under distributed system control, and comprises the steps of:

storing a dipole with respect to a data item shared by a node pair, a dipole half being stored in each node of the node pair specifying the status of the shared data item at the related node of the node pair assumed by this node of the node pair, with the data state of a given data item at this node being defined by the set of dipole halves stored at this node with respect to all related nodes sharing copies of said given data item;

responsive to a request for access to a data item from an application at this node, where this node stores a copy of the data item at a data state consistent with the request, granting the request without network interaction with other nodes; otherwise, responsive to a request for access to a data item from an application at this node, where this node has a data state inconsistent with the request, negotiating a dipole change with each related node with which this node receiving the access request shares a conflicting dipole, and upon resolving all conflicting dipoles, granting the request; and responsive to an update request which has been granted, storing the updated data item at this node and only thereafter in connection with application requests communicated from related nodes, or in the course of data base conformation processing with respect to related nodes, communicating the updated data item to related nodes.

BRIEF DESCRIPTION OF THE DRAWINGS

FIGS. 7A and 7B provide a more detailed diagrammatic illustration of the formats and field interrelationships associated with the quark processing unit of FIG. 4.

DESCRIPTION OF THE PREFERRED EMBODIMENT

Figure 1:
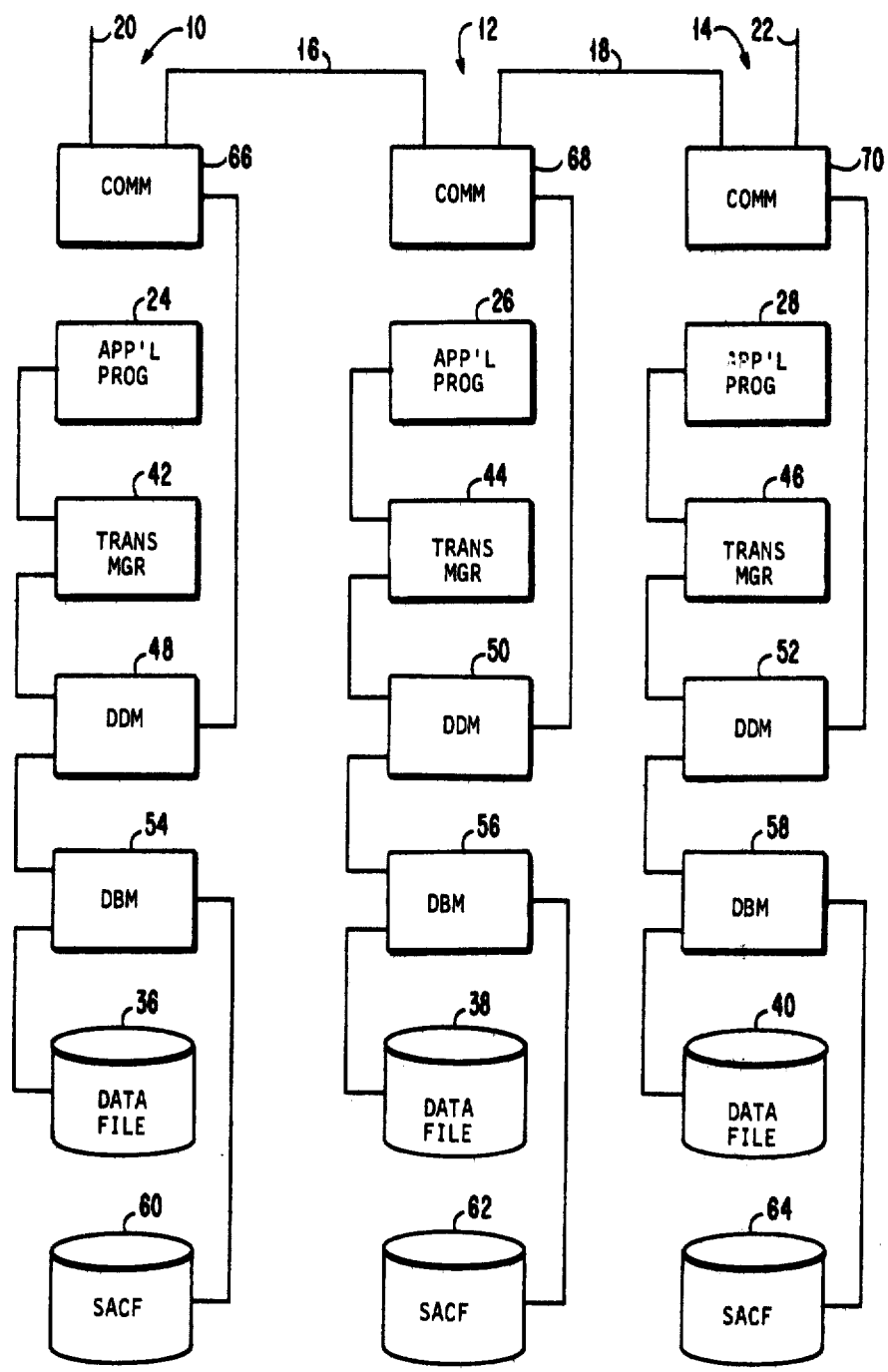
FIG. 1 is a diagrammatic flowchart showing the data storage, processing, and communication resources to be allocated among competing tasks in a representative configuration of nodes in a distributed data base and multiprocessing/multiprogramming system.

According to the preferred embodiment of the invention, the distributed data control system components are illustrated in FIG. 1, which shows three nodes 10, 12, 14 interconnected by communication links 16, 18 and by links 20, 22 to other nodes in a distributed data base, multiprocessing, multiprogramming system. No one node is a primary node. Every node 10,12,14, ..., has the capability of storing some number of data items in respective data files: 36, 38, 40. Copies of data items are dynamically created at a node as required to support the processing which occurs at the node. Physically, a node may be a general purpose computer, or central electronic complex, such as an IBM System/360 or 370, described in U.S. Pat. No. 3,400,371 by G. M. Amdahl, et al, and in IBM System/370 Principles of Operation, IBM Publication GA22-7000-6.

Figure 2:
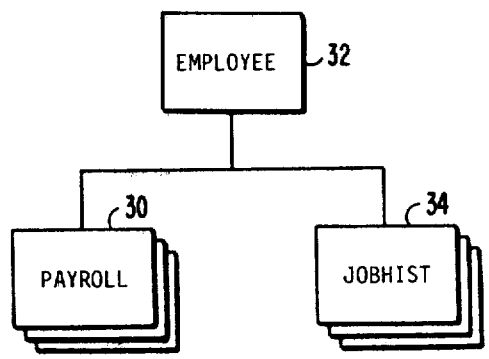
FIG. 2 is a diagrammatic illustration of a typical data base.

As is illustrated by the EMPLOYEE data base of FIG. 2, different applications have different requirements for the currency of the data they access. An application program 26, for example, which is updating the payroll information 30 to compute a raise for a given employee 32 needs to work with the most current value, herein designated CLEAN, of the PAYROLL segment 30. A data item is CLEAN, in the view of application program 26, if its value represents the most recently committed update and if there are no uncommitted updates outstanding: that is, no updates to the values in the employee's record, committed or uncommitted, will be allowed at another node 10, 14. However, another application program 28 which is preparing a report on job statistics by location is probably content with JOB-HIST segment 34 values which are possibly not the most current, herein designated PRIOR. PRIOR data allows those transactions which do not require the most recently committed value for a data item to enjoy potentially improved performance and availability.

Thus transactions within applications 24, 26 and 28 can have different currency requirements for the data they access. In generating a request for a data item, application program 24, would specify the key of the record sought and the appropriate currency. In this way, applications 24, 26, 28 can take advantage of the increased performance and availability which can often be achieved by specifying less stringent currency requirements. Typically, multiple transactions with differing currency requirements can process the same file simultaneously, and these transactions can be running at the same or different nodes 10, 12, 14. The specification of currency which may be performed under control of the system programmer and data base administrator facilities, by the application programmer, or by defaults, is concerned with concurrent usage of a data item where at least one user may be updating the data item. The term update is used generically to include insertion, deletion, and modification of data item contents. All updates are "atomic": A data item will never be read or updated while in a partially updated state with respect to a single update request. All updates are either committed or backed out. A committed update is an update that can no longer be backed out, and it will be made available to other transactions anywhere in the network, as will be described hereafter.

Referring once again to FIG. 1, the major components of the distributed data control system will be described. Each node 10, 12, 14 has the capability of storing some number of data items. In the exemplary embodiment described herein, a data item may be a DL/1 data base record, such as is shown in FIG. 2. These data items may be held uniquely at the node or may be replicas of data items held at one or more other nodes. This replica data is stored in data files 36, 38, 40, which may be located in main storage or on separate storage devices. Data which is required to honor an application data base call from, say, application program 26 can be requested from another node 10 and stored in data file 38. Existing data in data file 38 may have to be removed to make room for the new data. Application programs 24, 26, 28 run under the control of transaction managers 42, 44, 46, respectively. Examples of transaction managers 42, 44, 46 include IMS/VS DC, described in IBM publication GH20-1260, and CICS/VS, described in IBM publication GC33-0066.

Data distribution managers 48, 50, 52 ensure data integrity and consistency, and implement the major portion of the method steps of this invention, as will be described in greater detail hereafter. Data distribution manager 48 receives a data call from application 24 via transaction manager 42, ensures that the requested data is held at the required currency in data file 36, and then passes the data call to data base manager 54. Similarly, data base managers 56, 58 are provided at each of the other nodes 12, 14.

Access conflicts between application programs 24, 26, 28 running at different nodes 10, 12, 14 are managed using control information in a format designated dipoles. Each of the two nodes sharing a data item has one-half of the dipole. A node's dipole half describes that node's view of the other node's status for the shared data item. It describes, for example, whether a copy of the data item is available through the other node, the currency (CLEAN or PRIOR) it is assuming for its copy, and whether it is authorized to make updates to the data item. The format of a dipole half (sometimes abbreviated in the figures and text as DIPOLEH) will be described hereafter in connection with FIG. 7.

The set of all dipole halves held at a node defines the status of the data at the node, and is referred to as the data state at the node. Data state information is held in the status and control (SAC) files 60, 62, 64 for nodes 10, 12, and 14, respectively. Data distribution manager (DDM) 48 can determine from SAC file 60 whether or not applications 24 at its node 10 can safely reference or update a data item in data file 36 as well as obtain information about the currency of the data item.

Any item an application program 24 inserts, deletes, or replaces a data item in data file 36 a record of the update is placed in SAC file 60. It is not necessary to inform other locations 12, 14 of the updates as they occur at node 10, and thus, conformation of the copies held at the other node is deferred.

Data base manager 54 receives data calls from transaction manager 42 (which have been intercepted by data distribution manager 48 and processed as hereinafter described), and accesses data file 36 according to the data call and returns the results to the application through elements 42 and 48. Examples of data base managers useful herein are DL/1 DOS/VS, described in IBM publication GH20-1246, and IMS/VS, described in IBM publication GH20-1260. The description of this preferred embodiment will assume a DL/1 environment.

Figure 3:
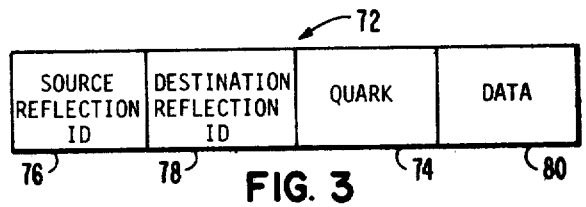
FIG. 3 is a diagrammatic representation of the format of a communication message.

Communication facilities 66, 68, 70 provide internodal communication, and the following, for example, may be used as such communication facilities: ACF/VTAM, described in IBM publication GC38-0282 and IMS/VS DC, supra. The multiple region option (MRO) of CICS/VS may be used when a plurality of nodes 10, 12, 14 physically reside on the same central electronic complex. Processing of a transaction request for a data item at a node is governed by the data state at the node, which as previously noted is defined by the set of dipole halves stored in the node's SAC file, with a dipole half existing for each combination of this node and related node. As each dipole half describes this node's view of the corresponding data item at the related node, the state at this node is an exocentric view of the status of data in the network. Dipole halves are communicated between nodes 10, 12, 14 over links 16, 18 in messages 72 having the format FIG. 3. Referring to FIG. 3, a message 72 from a source node (say, 12) to a destination node (say, 14) includes the following fields: source reflection ID 76, destination reflection ID 78, quark 74 and data 80. If data 80 accompanies a message 72, its presence will be indicated by a field in a request dipole half in quark 74.

Quark 74 describes a unit of work, and is used to communicate and respond to requests for dipole changes and data. It includes the following fields: requesting node name and data file (RN), this node name and data file (TN), data item key (K), request dipole half at TN for RN, dipole half at RN for TN, and response desired indicator (RDI). Processing at source node 12 may be waiting on a response to this message 72. If processing is waiting, then some identification of that processing is sent in source reflection ID. When destination node 14 prepares a response, it returns this ID in the destination reflection ID field 78 of message 72. The distributed data manager 52 at destination node 14 may be waiting on this message 72. That processing is identified by destination reflection ID 78 of this message 72. This information is used at destination node 14 to determine locking requirements and in notifying the waiting DDM 52 when this message 72 has been received and successfully processed at destination node 14.

Figure 4:
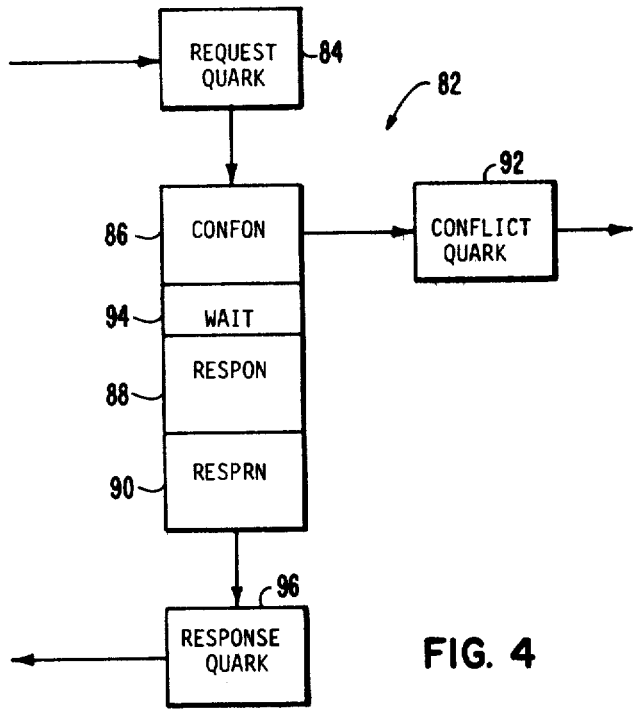
FIG. 4 is a diagrammatic illustration of a quark processing unit.

Referring now to FIG. 4, description will be given of the fundamental quark processing unit 82.

Request quark 84 is analyzed by procedures defined by one or more of the three tables: conflict determination (CONFON) 86; request reflection (RESPON) 88; and response generation (RESPRN) 90.

CONFON 86 determines whether or not there are conflicts for a given request quark 84. The data item key in request quark 84 is used to select those dipole halves which describe the same data item for nodes other than the requesting node. Each dipole half for another node is compared to the desired dipole half for the requesting node. If there is a conflict, then conflict quark 92 is generated to be sent to the other node.

If any conflicts were found, then quark processing unit 82 waits 94 until notified that all conflicts 92 have been resolved before further processing request quark 84.

RESPON 88 determines whether or not any dipole halves for other nodes need to be modified to reflect the processing of quark 84 from the requesting node. For example, if request quark 84 is accompanied by a new data item value, then the dipole halves for all other nodes with a replica of that data item may need to be marked to indicate that those other nodes now have worse data than this node.

RESPRN 90 changes the dipole half for the requesting node to reflect processing of request quark 84 and generates response quark 96.

Figure 5:
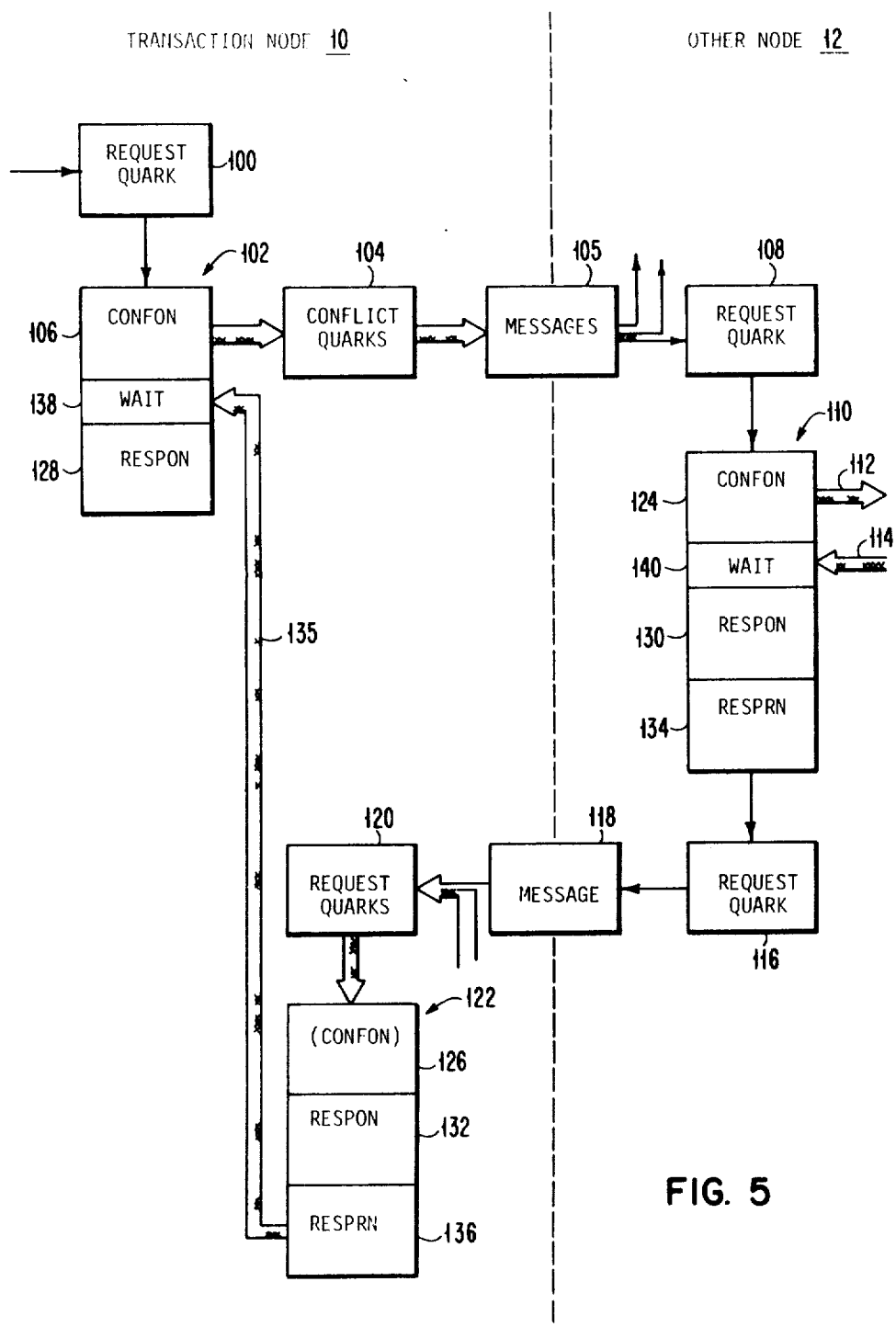
FIGS. 5 and 6 are flowchart illustrations of the method steps required to process a request for access to a data item and a utility program request, respectively.

Referring now to FIG. 5, a description will be given of an overview of the processing of request, conflict, and response quarks for a transaction request (data call) occurring at transaction node 10. The process is initiated by receipt at a transaction node 10 of a data call from an application 24 at node 10 for access to a data item, the data call including the data item key and the currency requirements.

DL/I calls GU, GHU, and ISRT are data calls in the exemplary embodiment. Quark processing is not required for DL/I calls REPL, DLET, GNP, and GHNP calls since DL/I requires that they be immediately preceded by one of the above data calls. (The DL/I calls GN and GHN are not supported since they do not necessarily include a key K.)

In addition, for each data item modified by the application program, the equivalent of a data call called local advice (LADV) is generated by the DDM at the time the modification is committed by the Data Base Manager. Quark processing must be performed for each such LADV.

The data call is converted into a request quark 100, which is processed through quark processing unit 102 executed by data distribution manager 48 to ensure that the requested data is held at the required currency in data file 36 of this transaction node 10. Conflict quarks 104 are generated and processed as required at other nodes (including 12) to resolve conflicting data states, with a conflict quark 104 generated for each conflicting dipole half identified by CONFON 106.

Each conflict quark 104, outgoing from node 10 in message 105, becomes a request quark (such as 108) when received at another node (such as destination node 12). There the second request quark 108 is processed through an instance 110 of the quark processing unit. This may require the generation of still further conflict quarks for communication to still other nodes, as represented by links 112, where the process recurses. When a response represented by links 114 is received for each of the still further conflict quarks, the dipole half at other node 12 for node 10 is modified by RESPRN 134 to remove the original conflict between node 10 and node 12 (detected by CONFON 106), whereupon RESPRN 134 generates response quark 116. Since the response desired indicator (RDI) is set in request quark 108, derived from conflict quark 104, a response quark 116 is created and included in message 118 back to the source node 10.

If destination node 12 for this message 105 determines that an additional interchange is required to complete processing, then it sets the response desired indicator in response quark 116. A (response) message 118 is returned regardless of the indicator in quark 104. When received at the transaction node 10, response quark 116 becomes an instance of request quark 120, with one such instance required for each conflict quark 104 sent out from transaction node 10. Each instance of request quark 120 is processed through an instance 122 of quark processing unit 82, successful completion of which is required for instance 102 to process to completion.

Referring again to FIG. 5, quark processing units 102, 110, 122 include CONFON 106, 124, 126, RESPON 128, 130, 132, and RESPRN 134 and 136, respectively. RESPRN is not included in quark processing unit 102 since the request quark 100 is generated on behalf of a local application; no dipole half need be changed and no response quark need be generated. The first instance 102, 110 of a quark processing unit at a node also includes wait 138, 140. Such waits 138, 140 are not required in processing instances of request quark 120 received in response to conflict quark 104 because it is not expected that CONFON 125 will detect any conflicts with request quark 120; consequently, no conflict quarks will be generated by CONFON 126, and there will be no wait required. (CONFON 126 could, therefore, be eliminated but it is included in each instance of processing unit 122 to facilitate the implementation of the recursive unit 82 (122) described hereafter in connection with FIG. 7.)

The source reflection indentifier field 76 in message 105 is set by transaction node 10 to identify the wait 138. When other node 12 responds, message 118 will include a destination reflection identifier field 78 set to the above source reflection identifier to identify message 118 to wait 138. Lines 135 represent the collection of all (response) messages 118, which when received and processed permit completion of processing through RESPON 128. (As all dipole half changes required at node 10 in resolving conflict quarks 104 have been made by RESPRN 136, RESPON 128 can initiate a response to the data call from application 24.)

CONFON 86 (106, 124, 126), RESPON 88 (128, 130, 132), and RESPRN 90 (134, 136) are implemented, in this embodiment, by tables processed according to procedures to be described hereafter for performing the steps of identifying and resolving conflicting dipoles. CONFON 86 detects dipole conflicts between a request quark 84 received at a node (e.g., 10) and the dipole halves in SAC file 60 at that node. RESPRN 90 processes and updates as required the dipole half stored in SAC file (e.g., 60) of node 10 for a requesting node RN, and RESPON 88 processes and updates as required the dipole halves stored in the SAC file (e.g., 60) of node 10 for other nodes ON than the requesting node RN.

The preferred embodiment assumes that the two halves of a dipole can be changed by RESPRN 134, 136 within a single scope of recovery. CICS/VS OS/VS Version 1 Release 6 is an example of a transaction manager which provides such capability.

Figure 6:
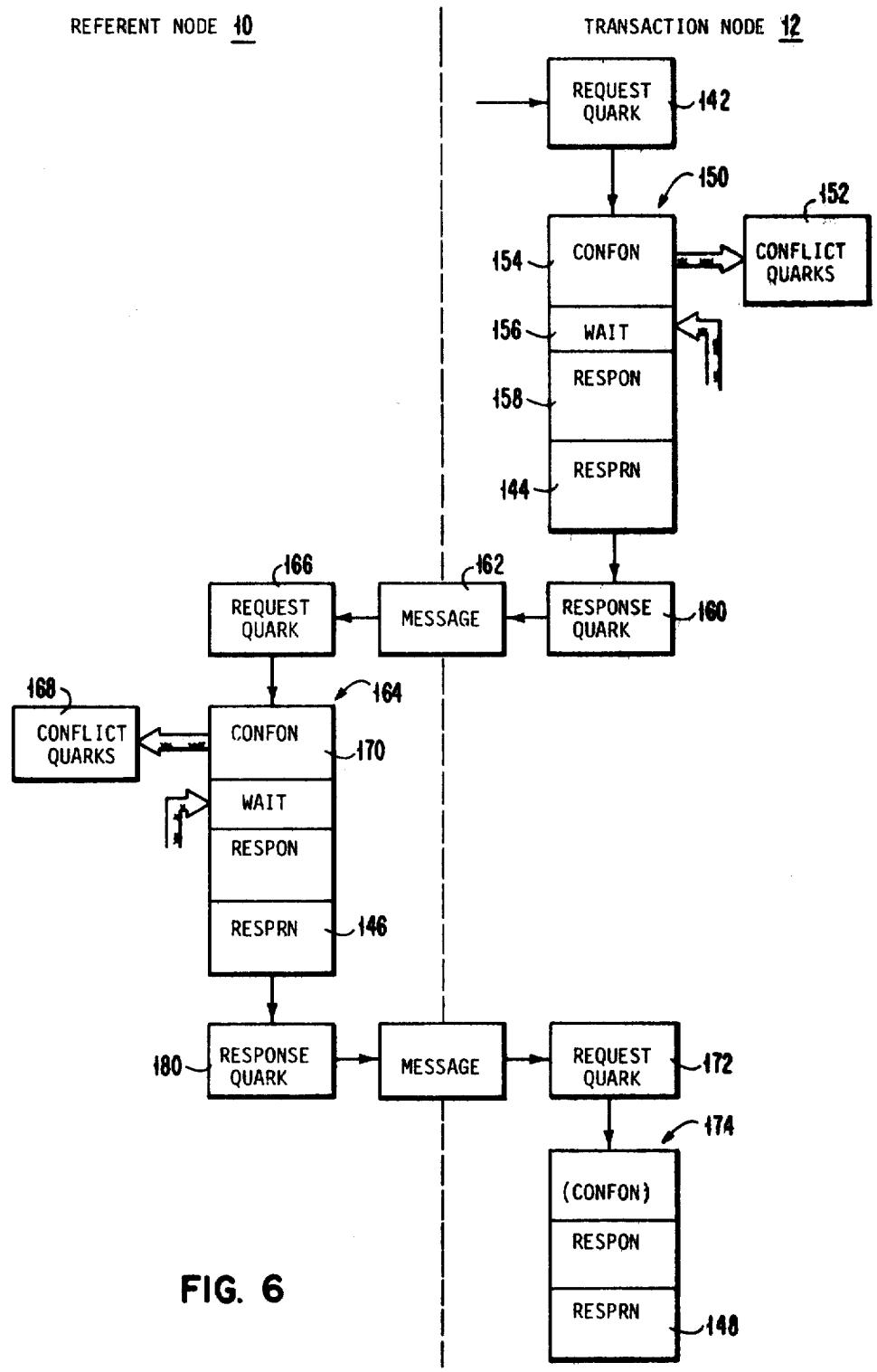

Referring now to FIG. 6, a description will be given of an overview of the processing of request, conflict, and response quarks for a utility program initiated request at node, say, 12, which for the purpose of FIG. 6 will be designated the transaction node. Examples of such utility program requests include conform, advise, and relinquish calls. An advise call is used to inform related nodes about changes to data items at a node, whereas a conform call is used to send the data item modifications to such related nodes. A relinquish call is used to expunge data items from a node's data file.

In FIG. 6, request quark 142 is made by the calling utility at node 12 to look as if it came from referent node, say node 10 for purpose of this explanation. (This is done by setting the requesting node name equal to node 10 in this example, which is the node to be relinquished to, advised, or conformed by this node 12, and by specifying the key of the data item to be acted upon.) In processing such a request, any two of RESPRN instances 144, 146, 148 will change dipole halves, which is the reason for this type of utility program activity.

The preferred embodiment assumes that the two halves of a dipole can be changed by RESPRN 144, 146, 148 within a single scope of recovery. CICS/VS OS/VS Version 1 Release 6 is an example of a transaction manager which provides such capabilty.

Request quark 142 is processed through quark processing unit 150, with conflict quarks 152 generated for each conflicting dipole half, if any, identified by CONFON 154. When these have all been resolved (by processing similar to that described in connection with quark processing units 110, 122 of FIG. 5), wait 156 terminates and processing continues through RESPON 158 and RESPRN 144, which will generate response quark 160 for transmission in message 162 to referent node 10 for processing through quark processing unit 164 as request quark 166.

Conflict quarks 168, if any, generated by CONFON 170 will be resolved, and response quark 180 returned to transaction node 12 for processing as request quark 172 through quark processing unit 174.

Figure 7:
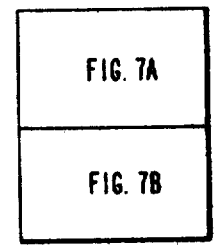
FIG. 7 shows the manner of combining FIGS. 7A and 7B into one illustration.
Figure 7B:
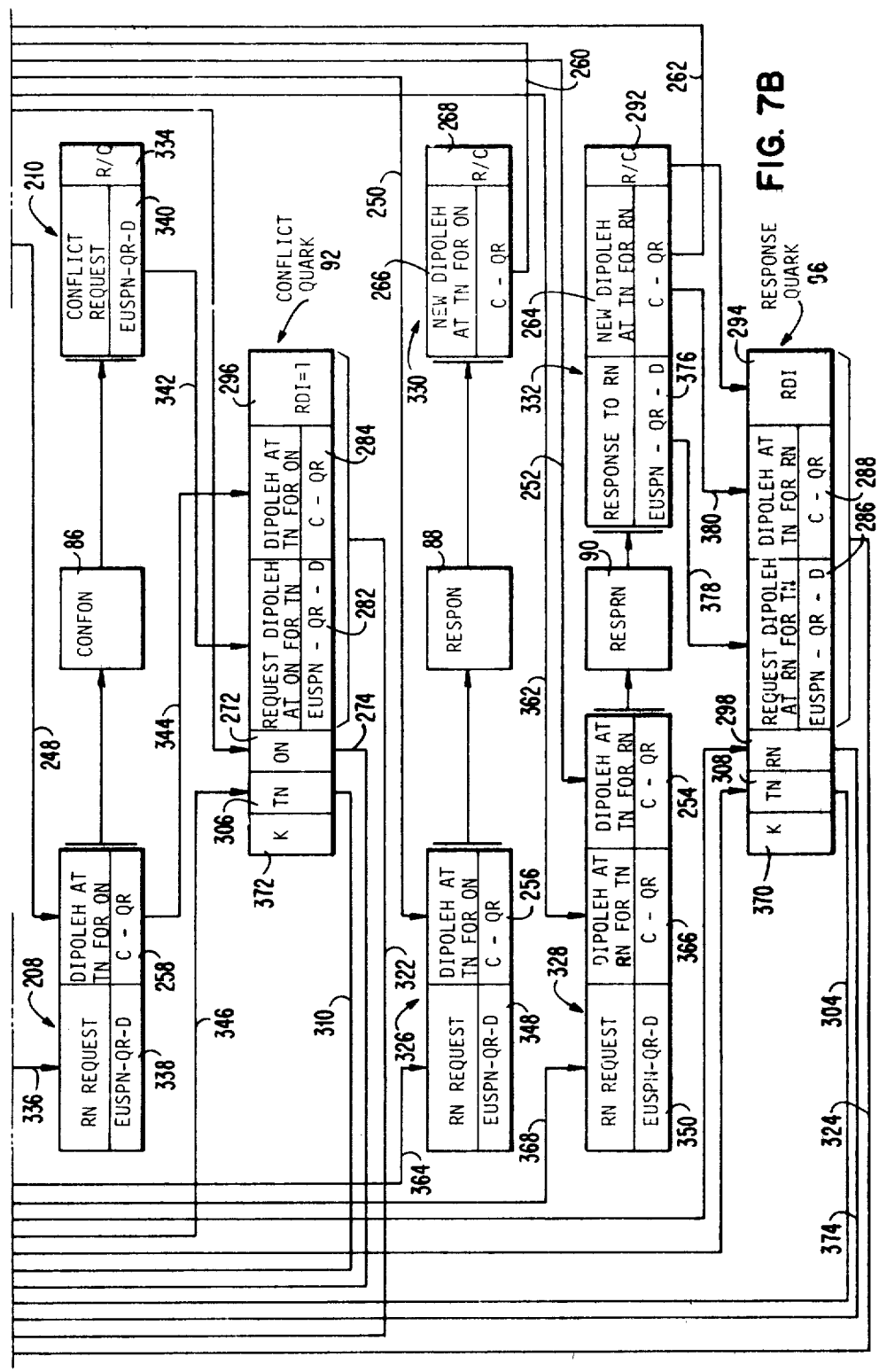

Referring now to FIGS. 7A and 7B, a description will be given of the procedures implementing the quark processing unit of FIG. 4. Illustrated in FIGS. 7A and 7B are DL/1 data call 202, programming interface dependent routine (PIDR) 204, SAC file (SACF) 206, and recursive representations of request quark 84, CONFON 86 and its input 208 and output 210 and outgoing conflict quark 92.

Data call 202 illustrates a DL/1 call 212 received at transaction node (TR) 214 for a data item identified by key 216. As is illustrated by line 218, call 212 is analyzed at PIDR 204 to determine set 220 of currency control values E, U, S, P, and N which satisfy the currency requirements of the data call, together with quality control and responsibility control (QR) 222. For this embodiment, a data accompanies indicator 224 of N (no data) is specified for all calls 226 and dipole half 228 is set to null (0-00) for calls 226 which require that PIDR 204 provide dipole half 228. (For the other calls, those originating from a utility, such as relinquish, conform, and advise, table 230 generates the dipole half 232 for request quark 84 from the dipole half 238 obtained from SAC file 206, as will be described hereafter.)

Response desired indicator 234 is set to no (0) or don't car (*). SAC file 206 stores the collection of dipole halves 238 at this node for related nodes 240. Each dipole half is identified by data item key 236 and the dipole half comprises current currency control status 238C, current quality control status 238Q, and current responsibility control status 238R. As is illustrated by lines 242, 244, SAC file 206 key field 236 is searched on keys 216 or 246 to identify dipole halves defining the data state of a data item with key 216, 246, respectively. As is illustrated by lines 248, 250, and 252, the SAC file 206 provides the dipole halves 238 required for input field 254 to RESPRN 90, input field 256 of RESPON 88, and input field 258 of CONFON 86. As is illustrated by lines 260 and 262, dipole half 238 is updated by output field 264 of RESPRN 90 and output field 266 of RESPON 88, respectively, for return codes 268 not equal to zero in the case of RESPON 88. As is illustrated by line 270, related node field 240 for data item 236 becomes ON field 272 of an outgoing conflict quark 92 and (as is illustrated by line 274), becomes this node field 276 at the receiving node where outgoing conflict quark 92 becomes an instance of request quark 84.

Current currency control status 238C describes the currency of the contents of the data item identified by key 236 which is available at or through related node 240. Currency control status 238C can assume the value exclusive (E), unique clean (U), shared clean (S), prior (P), or not accessible (N).

A currency control status 238C of exclusive (E) designates that access to the data designated by key 236 is available only through related node 240. Neither this node nor any other node related to this node, other than the node with exclusive access (or a node related to it), can access a value for this data item.

A currency control status 238C of unique clean (U) designates that access to the only known clean value for the contents of the data item designated by key 236 is available through related node 240. Related node 240, or a node with access through related node 240, may be modifying, and committing the modifications, for the data item described by key 236. Neither this node nor any other related node can assume that it has the most recently committed update for this data item.

A currency control status 238C of shared clean (S) designates that a clean, but not unique, value for the data item identified by key 236 is available through related node 240. At least one node, and possibly more, is assuming it has the most recently committed values for the data and that no modifications are in process.

A currency control status 238C of prior (P) designates that a prior, but not necessarily clean, value for the contents of the data item identified by key 236 is available through related node 240. Neither related node 240 nor nodes with access through related node 240 is assuming it has the most recently committed value for the data item.

A currency control status 238C of not accessible (N) designates that related node 240 is not accessing the data item identified by key 236 and is not known by this node to have access to a value through some other node.

Quality control status 238Q describes the quality of the data item identified by key 236 at or through related node 140. It provides suppport for the flow of information about data modifications. Quality control status 238Q can assume the values no known difference (N), better (B), worse (W), and acknowledged (A).

A quality control status 238Q of no known difference (N) designates that no advice or data has been received at this node from related node 240 since the data item identified by key 236 was last sent to or received from related node 240.

A quality control status 238Q of better (B) designates that this node has been advised that better data is available through the related node 240.

A quality control status 238Q of worse (W) designates that worse data is available at related node 240 than is available at this node. Changes to the data item have been made or received at this node or advice of changes has been received at this node, and these changes have not yet been sent to related node 240, and related node 240 has not been advised of these changes. Worse quality W is used, among other things, to trigger the unsolicited flow of data by the conformation process.

A quality control status 238Q of acknowledged (A) designates that related node 240 has been advised and has acknowledged the advice. Related node 240 has not been sent the better data available at or through this node.

Responsibility control status 238R indicates whether this node or related node 240 has agreed to always be able to obtain a copy of the data item identified by key 236 at the currency given by currency control status 238C. It can assume the value yes (Y), no (N), or both (B).

Responsibility control status yes (Y) designates that related node 240 has accepted responsibility, and does not expect this node to accept such.

Responsibility control status no (N) designates that related node 240 has not accepted responsibility but does expect this node to accept such.

Responsibility control status 238R both (B) designates that related node 240 and this node have each accepted responsibility.

In an exemplary embodiment, a default responsibility control status 238R value of YES is accepted by node 240 if that node has a current currency control status 238C of exclusive (E) or unique clean (U); a value both (B) if shared clean (S); and the value no (N) otherwise. This default status allows for the expunging of prior replicas at a node's discretion without requiring communication to other nodes.

For ease of explanation in connection with numerous dipole half values in the examples which follow, in order to clarify the status of various nodes, 10, 12, 14 in the network, the following format will be used for dipole halves in a SAC file 206:

[TN KEY N C-QR]

where TN is this node, the node at which the dipole half is stored; and N is the other node, the node for which this dipole half is stored at this node.

Thus by way of example, a dipole half [12 A 10 S-NB] represents a dipole half stored at this node 12 describing its view of the currency control status S, quality control status N, and responsibility control status B of data item A at node 10. (Asterisks "*" will be used to mean "don't care.") In FIGS. 7A and 7B, a dipole half may be represented by either the current form designation C-QR or in the request form EUSPN-QR-D with node ID's TN, ON, RN and Key K found in concatenated fields (in a quark) or implied (in table input/outputs). The format of a requested dipole half is [EUSPN-QR-D]. EUSPN represents a set of currency control status values. A dot "." means that the given currency control value is not included in the set. As before, QR represents a value for quality control and responsibility control respectively, and D represents "does data accompany", and can assume the values yes (Y) or no (N).

Table 1 summarizes the above possible values for various fields which may be included in a dipole half;

TABLE 1
Dipole Half Status Values

| Currency Control | C | E | Exclusive |
| | | U | Unique Clean |
| | | S | Shared Clean |
| | | P | Prior |
| | | N | Not accessible |
| Quality Control | Q | N | No known difference |
| | | B | Better data |
| | | W | Worse data |
| | | A | Acknowledged advice |
| Responsibility Control | R | N | Does not accept responsibility |
| | | Y | Accepts responsibility |
| | | B | Both accept responsibility |

Having described the dipole half 238, a description will now be given of quarks 84, 92, 96, CONFON 86, RESPRN 90, and RESPON 88.

Request quark 84 is a request from requesting node RN 278 received at this node TN 276 requesting that this node TN 276 store dipole half 280 in its SAC file 206 for data item 246. Requesting node RN 278 includes in quark 84 the dipole half 232 which it stores in its SAC file (not shown) for data item with key 246 with respect to this node TN 276. If message 72 includes data, its presence is indicated by data accompanies field 280D of quark 84. Such is the case, for example, when data is communicated between nodes for the purpose of conforming a prior data item. Table 2 gives the format of request quark 84 together with the possible values for the various fields. The format of conflict quark 92 and response quark 96 is analogous to that of request quark 84, and the meaning of fields 282, 284, 286, 288 will be apparent from the above description, Table 2, and the various field headings. Response desired indicator field 290 in request quark 84 is used to determine if response quark 96 is to be built and sent. A no response desired (0) value in field 290 will be overridden based on return code 292 from RESPRN 90, if RESPRN 90 determines that source node RN 298 requires a dipole or data change. It may also set a response desired indicator 294 in response quark 96. Response desired indicator 296 will always be set in conflict quark 92.

TABLE 2

| Request Quark 84 Format | | | |
|---|---|---|---|
| Data Item Key | 246 K | | |
| This Node | 276 TN | | |
| Requesting Node | 278 RN | | |
| Dipole Half Requested at TN for RN | 280 EUSP-QR-D | CURRENCY CONTROL SET (EUSPN) | |
| | | E | Exclusive |
| | | U | Unique Clean |
| | | S | Shared Clean |
| | | P | Prior |
| | | N | Not accessible |
| | | QUALITY CONTROL (Q) | |
| | | N | RN wants data sent only if better data available |
| | | B | RN has better data |
| | | A | RN acknowledges advice |
| | | RESPONSIBILITY CONTROL (R) | |
| | | N | RN doesn't wish to accept responsibility |
| | | Y | RN accepts responsibility and doesn't expect TN to |
| | | B | RN wants both nodes to accept responsibility |
| | | DATA ACCOMPANIES (D) | |
| | | N | Data does not accompany |
| | | D | Data accompanies |
| Dipole Half at RN for TN | 232 C-QR | CURRENCY CONTROL STATUS (C) EUSPN QUALITY CONTROL STATUS (Q) NBA RESPONSIBILITY CONTROL STATUS (R) NYB | |
| Response Desired Indicator | 290 RDI | 1 | Yes |
| | | 0 | No |

As is represented by lines 300 and 302, the this node TN and requesting node RN fields 276 and 278 take on the value of transaction node TR 214 for those instances where request quark 84 is formed from a data call originating from a transaction executing at this node. As is represented by lines 310 and 304, requesting node RN field 278 of request quark 84 formed from a conflict quark 92 or response quark 96 originating at another node takes on the value of this node TN field 306 or 308, respectively. Similarly, as is represented by line 374, this node TN field 276 takes on the value of requesting node field 298 when request quark 84 is formed from a response quark 96 instance originating at another node.

As is represented by lines 312, 314, 316, 318, 320 when building a request quark 84 from a data call by an application or a utility request at this transaction node 214, request dipole half 280 is built from fields 220, 222, 224, and dipole half 232 is established by field 228 of PIDR 204 (for a data call) or field 238 of SAC file 206 according to generation table 230 (for a utility request). In Table 3 is set forth the generation table 230 of RN dipoleh 232 from TN dipoleh 238. RDI 290 is established by RDI 234 of PIDR 204.

TABLE 3

RN DIPOLE HALF GENERATION TABLE 230

|  | (Input) TN DIPOLEH (238) | (Output) RN DIPOLEH (232) |
|---|---|---|
| CURRENCY CONTROL (C) | E | N |
|  | U | P |
|  | S | S |
|  | P | U |
|  | N | E |
| QUALITY CONTROL (Q) | N | N |
|  | B | A |
|  | W | N |
|  | A | B |
| RESPONSIBILITY CONTROL (R) | N | Y |
|  | Y | N |
|  | B | B |

When request quark 84 is built from a conflict quark (such as is the case for request quark 108), or from a response quark 96 (such as request quark 120), then fields 280, 232, 290 are, without modification, the corresponding fields 282, 284, 296 of conflict quark 92 or fields 286, 288, 294 of response quark 96. This is represented by lines 322 and 324, respectively.

CONFON 86, RESPON 88, and RESPRN 90 procedures are defined by tables 4, 5, and 6, respectively, which are processed as follows: each table is provided with a search input and a search output. Each table comprises two parts; an input part and an output part and the search result output is initialized to blanks and the current return code is initialized to zero. The tables are searched as follows:

1. The table is scanned sequentially looking for one or more row matches. A row matches if the input part of the row is the same as the search input 208, 326 or 328.
2. Parts of the row marked by an asterisk (*) in the table are ignored in searching for a match.
3. When a match is found, non-blank parts of the output part of the row are copied into the corresponding positions of the search output 210, 330, 332.
4. When a match is found, the return code portion 334, 268, 292 of the row (always the last position) replaces the current return code if it is larger than the current return code.
5. The search continues until the row 'E N D' is encountered.

According to the above procedure, the different parts of the search output 210, 330, 332 are built up by matches in multiple rows. In some cases, the output part of one row will override parts of the search output which have been built from previous matches—the most recent match prevailing when the most recent match adds a character to a character position in the result output set by a previous match.

Request quark 84 and SAC file 206 provide the inputs to CONFON 86, as is represented by lines 336 illustrating that RN request field 338 is formed from request dipole half 280, and by line 248 illustrating that dipole half field 258 is formed from SAC file field 238. A CONFON input 208 is thus formed for each instance of a dipole half 238 in SAC file 206 for key 216 (from a data call or a utility request) or 246 (from another node) where related node 240 differs from requesting node 278.

The table defining CONFON 86 is set forth in Table 4. Input 208 to CONFON is requesting node RN request 338 and dipole half at this node TN for other node ON 258. Output 210 of CONFON 86 includes conflict request 340 and return code 334. Requesting node RN request 338 is derived as is represented by line 336 from a request quark 84 received at this node TN 276 from requesting node RN 278 (which requesting node RN 278 may also be the same as this node TN 276 for a data call 202 originating from an application executing on transaction node TR 214). Request node RN 278 wants this node TN 276 to change to the dipole half 280, 338. If a conflict with other node 240 dipole half 258, 238 is found, a conflict quark 92 will be formed from conflict request 340 and sent out to that other node ON 240, 272 as is represented by line 342. In processing a request quark 84, a search is made of the SAC file 206 at this node TN 276 for all dipole halves relating to data item with key 216, 246, and each of these for which related node 240 differs from requesting node 278 is processed in turn through CONFON 86 as other node ON 240, 272.

The return codes 334 are as follows:
0—No conflict between RN Request 338 and ON Dipole Half 258.
4—Request quark 338 conflicts with ON Dipole Half 258.

TABLE 4

```
DCL CONFON CHAR INIT(                                                  00000100
/*****************************************************************    00000200
*                                                                  *   00000300
*                     CONFON                                       *   00000400
*                                                                  *   00000500
*                                                                  *   00000600
********INPUT******************  *********OUTPUT****************       00000700
*                               *                                  *   00000800
*                               *                                  *   00000900
*                               *              RETURN CODE ----,   *   00001000
*                               *                              |   *   00001100
*                               *                              |   *   00001200
*                T.N.           *                              |   *   00001300
*    REQUEST    DIPOLE          *   CONFL.                     |   *   00001400
*    FROM R.N.   1/2            *   REQUEST                    |   *   00001500
*                               *                              |   *   00001600
*    EUSPN-QR-D  C-QR           *   EUSPN-QR-D                 |   *   00001700
*                               *                                  *   00001800
                                                                   */  00001900
/***  ***  ***  ***  ***  ***  ***  ***  ***  ***  ***  ***  ***  *    00002000
```

```
*                                                            *  00002100
*                  CONFON -- NO CONLICT                      *  00002200
*                                                            *  00002300
*    THE FOLLOWING ROWS COMPUTE A "NO-OP" CONFLICT REQUEST -- ONE  *  00002400
*    THAT JUST MAINTAINS THE STATUS QUO WITH RESPECT TO O.N. *  00002500
*                                                            *  00002600
*    IF CONFLICTS ARE DETECTED BY ROWS IN OTHER SECTIONS, THEN     *  00002700
*    PARTS OF THE CONFLICT REQUEST DERIVED HERE WILL BE OVERRIDDEN. *  00002800
*                                                            *  00002900
*** *** *** *** *** *** *** *** *** *** *** *** *** *** *** *** ***  */00003000
/* CURRENCY CONTROL - NO CONFLICTS                               */00003100
        '*****-**-* E-**            ....N-   -         0',   /*  00003200
          O.N. HAS EXCLUSIVE.                                    00003300
                                                              */00003400
        '*****-**-* U-**            ...P.-  -         0',   /*  00003500
          O.N. HAS UNIQUE CLEAN.                                 00003600
                                                              */00003700
        '*****-**-* S-**            ..S..-  -         0',   /*  00003800
          O.N. HAS SHARED CLEAN.                                 00003900
                                                              */00004000
        '*****-**-* P-**            .O...-  -         0',   /*  00004100
          O.N. HAS PRIOR.                                        00004200
                                                              */00004300
        '*****-**-* N-**            E....-  -         0',   /*  00004400
          O.N. HAS NOT ACCESSIBLE.                               00004500
                                                              */00004600
/* RESPONSIBILITY - NO CONFLICTS                                 */00004700
        '*****-**-* *-*N                  - Y-         0',   /*  00004800
          T.N. HAS SOLE RESPONSIBILITY.                          00004900
                                                              */00005000
        '*****-**-* *-*Y                  - N-         0',   /*  00005100
          O.N. HAS SOLE RESPONSIBILITY.                          00005200
                                                              */00005300
        '*****-**-* *-*B                  - B-         0',   /*  00005400
          O.N. AND T.N. SHARE RESPONSIBILITY.                    00005500

*/00005600
/* QUALITY CONTROL - NO CONFLICTS                                */00005700
        '*****-**-* *-**                  -N -N        0',   /*  00005800
          NO KNOWN DIFFERENCE IN QUALITY BETWEEN T.N. AND O.N.   00005900
                                                              */00006000
/*** *** *** *** *** *** *** *** *** *** *** *** *** *** *** *** *  00006100
*                                                            *  00006200
*                  CONFON -- QUALITY                         *  00006300
*                                                            *  00006400
*    THE FOLLOWING ROWS DETERMINE CONFLICTS FOR THE DATA     *  00006500
*    TRANSFER CONTROL PART OF THE REQUEST.                   *  00006600
*                                                            *  00006700
*    IF A CONFLICT IS FOUND BELOW, THEN THIS QUALITY CONTROL *  00006800
*    ELEMENT SHOULD REFLECT THE DESIRE FOR NO KNOWN DIFFERENCE *  00006900
*    IN DATA QUALITY.  DATA IS NEVER SENT WITH A CONFLICT QUARK. *  00007000
*                                                            *  00007100
*                                                            *  00007200
*** *** *** *** *** *** *** *** *** *** *** *** *** *** *** *** */00007300
        '*****-**-* *-B*                  -N -N        4',   /*  00007400
          GET BETTER DATA FROM O.N.                              00007500

*/00007600
/*** *** *** *** *** *** *** *** *** *** *** *** *** *** *** *** *  00007700
*                                                            *  00007800
*            CONFON -- CURRENCY (& RESPONSIBILITY)           *  00007900
*                                                            *  00008000
*    THE FOLLOWING ROWS DEAL WITH COMPUTING THE CURRENCY     *  00008100
*    CONTROL SET FOR THE CONFLICT REQUEST.                   *  00008200
*                                                            *  00008300
*    IT ALSO MAINTAINS THE DESIRED RELATIONSHIP BETWEEN CURRENCY *  00008400
*    CONTROL AND RESPONSIBILITY.                             *  00008500
*                                                            *  00008600
*** *** *** *** *** *** *** *** *** *** *** *** *** *** *** *** */00008700
        '***P.-**-* E-**            EUSP.- N-          4',   /*  00008800
          PRIOR CONFLICTS WITH EXCLUSIVE                         00008900
                                                              */00009000
        '***S..-**-* E-**           EUS..- B-          4',   /*  00009100
          SHARED CLEAN CONFLICTS WITH EXCLUSIVE                  00009200
                                                              */00009300
        'U...--* E-**           EU...- Y-          4',   /*  00009400
```

```
UNIQUE CLEAN CONFLICTS WITH EXCLUSIVE                                   00009500
                                                                     */00009600
'E....-**-* E-**          E....-BY-N             4',     /*  00009700
EXCLUSIVE CONFLICTS WITH EXCLUSIVE                                      00009800
                                                                     */00009900
'S..--* U-**          EUS..- B-               4',    /*  00010000
SHARED CLEAN CONFLICTS WITH UNIQUE CLEAN                                00010100
                                                                     */00010200
'*U...-**-* U-**          EU...- Y-               4',    /*  00010300
UNIQUE CLEAN CONFLICTS WITH UNIQUE CLEAN                                00010400
                                                                     */00010500
'E....-**-* U-**          E....-bY-N             4',     /*  00010600
EXCLUSIVE CONFLICTS WITH UNIQUE CLEAN                                   00010700
                                                                     */00010800
'*U...-**-* S-**          EU...- Y-               4',    /*  00010900
UNIQUE CLEAN CONFLICTS WITH SHARED CLEAN                                00011000

*/00011100
'E....-**-* S-**          E....-BY-N             4',     /*  00011200
EXCLUSIVE CONFLICTS WITH SHARED CLEAN                                   00011300
                                                                     */00011400
'E....-**-* P-**          E....-PY-N             4',     /*  00011500
EXCLUSIVE CONFLICTS WITH PRIOR                                          00011600
                                                                     */00011700
'E N D                                            '      /*  00011800
*THIS ENTRY IDENTIFIES THE END OF THIS TABLE*                       00011900
                                                                     */00012000
) ;                                                                     00012100
```

Outgoing conflict quark 92 is generated in response to a return code 334 not equal to zero, for each dipole half 258, 238 defining an inconsistent data state with respect to request 338, 280. Quark 92 is formed from CONFON output field 340 and input field 258 as is represented by lines 342 and 344, respectively. This node TN 306 is the same as this node 276 as is represented by line 346.

The table defining RESPON 88 is set forth in Table 5, and that defining RESPON 90 is set forth in Table 6. When all conflict quarks 92 sent out from this node 306 have been responded to by each of other nodes 272, as is represented by line 135 into wait 138 and line 114 into wait 140 (see FIG. 5), then execution passes to each of RESPON 128 or 130 and RESPRN 134. If no conflict quarks 92 have been required, then on the basis of return code 334 of CONFON output 210 being zero, execution passes to RESPON 88 and RESPRN 90. This is the case for each instance of quark processing unit 122 because response quarks 116 (converted to request quarks 120 at transaction node 10) will contain a request state dipole 258 consistent with the request dipole half 280, 338 of request quark 84, 120. Execution of RESPON 88 and RESPRN 90 may proceed independently, as each operates on different dipole halves 256, 254 for comparison with RN requests 348, 350. However, RESPRN 90 will not be processed if TN 276 equals RN 278 in request quark 84. RESPRN 90 executes to bring into synchronization with RN request 350 the dipole half 254 which, if altered, will be written into SAC file 206 as new dipole half 264, 238. As is represented by lines 362 and 364, dipole half 232 from requesting node 278 forms an input dipole half 366 to RESPRN 90, as does request dipole half 280, 350. Dipole half 232 from related node 278 is that one dipole half maintained in SAC file 206 for data item 246 at that node 278 for this node 276. In the instance of RESPRN 90 input dipole half 254, the dipole half 238 at TN for RN obtained from SAC file 206, as represented by line 252, is the dipole half at TN for the requesting node RN 278. This is to be contrasted with RESPON 88 input dipole half 256 which, as is represented by line 250, will receive dipole halves 238 for all other nodes N 240 for comparison with RN request dipole half 348, 280 represented by line 368. Thus, as is represented by line 260, new dipole half 266 updates the SAC file 206 entry 238 for other nodes N 240 and, as is represented by line 262, new dipole half 264 updates the SAC file 206 entry 238 for the requesting node RN (as specified in request quark 84).

As a result of executing RESPRN 90, outgoing response quark 96 is built for data item with key 370 (which, of course, is the same as is specified by key fields 216, 246, 372, and 236) if RDI 290 is equal to 1 and if indicated by the RESPRN 90 return code 292. Outgoing response quark 96 TN field 308 and RN field 298 will be exchanged into the corresponding fields 278 and 276, respectively, in request quark 84 as is represented by lines 304, 374, respectively. Request dipole half 286 is obtained from response dipole half 376 as is represented by line 378. Dipole half 288 is obtained from new dipole half 264 as is represented by line 380.

As a part of RESPRN 90 processing, data 80 is moved from the incoming message 72 and stored in the data file 36, 38, 40 at the node where RESPRN 90 is executing. The data replaces any existing data with the same key 216; its presence in the message is indicated by the data accompanies indicator 280D in request quark 84.

Also as a part of RESPRN 90 processing, data 80 is read from the data file 36, 38, 40 and placed in the outgoing message 72. The requirement for data is indicated in the data accompanies indicator 286D in response quark 96.

TABLE 5

```
DCL RESPON CHAR INIT(                                                              00012200
/*******************************************************************              00012300
*                                                                   *              00012400
*                        RESPON                                     *              00012500
*                                                                   *              00012600
*                                                                   *              00012700
*  **********  INPUT  ****************  ********  OUTPUT  **********              00012800
*                                       *                           *              00012900
*                                       *                           *              00013000
*                                       *          RETURN CODE --,  *              00013100
*                                       *                        |  *              00013200
*                                       *                        |  *              00013300
*      REQUEST          T.N.            *      NEW T.N.          |  *              00013400
*      FROM             DIPOL           *      DIPOL             |  *              00013500
*      R.N.             1/2             *      1/2               |  *              00013600
*                                       *                        |  *              00013700
*      EUSPN-QR-D       C-QR            *      C-QR              |  *              00013800
*                                                                   *              00013900
/***  ***  ***  ***  ***  ***  ***  ***  ***  ***  ***  ***  ***  ***  *          00014000
*                                                                   *              00014100
*                                                                   *              00014200
*                RESPON -- RESPONSIBILITY                           *              00014300
*                                                                   *              00014400
*   THE FOLLOWING ROWS KEEP EXISTING O.N. RESPONSIBILITY THE SAME.  *              00014500
*                                                                   *              00014600
***  ***  ***  ***  ***  ***  ***  ***  ***  ***  ***  ***  ***  ***  *            00014700
                                                                                   */00014800
          '*****-**-*       *-*Y             - Y          0',   /*                  00014900
                                                                                   */00015000
          '*****-**-*       *-*N             - N          0',   /*                  00015100
                                                                                   */00015200
          '*****-**-*       *-*B             - B          0',   /*                  00015300
                                                                                   */00015400
/***  ***  ***  ***  ***  ***  ***  ***  ***  ***  ***  ***  ***  ***  *            00015500
*                                                                   *              00015600
*                RESPON -- CURRENCY                                 *              00015700
*                                                                   *              00015800
*   THE FOLLOWING ROWS KEEP EXISTING O.N. CURRENCY THE SAME.        *              00015900
*                                                                   *              00016000
***  ***  ***  ***  ***  ***  ***  ***  ***  ***  ***  ***  ***  ***  *            00016100
                                                                                   */00016200
          '*****-**-*       E-**            E-           0',   /*                   00016300
                                                                                   */00016400
          '*****-**-*       U-**            U-           0',   /*                   00016500
                                                                                   */00016600
          '*****-**-*       S-**            S-           0',   /*                   00016700
                                                                                   */00016800
          '*****-**-*       P-**            P-           0',   /*                   00016900
                                                                                   */00017000
          '*****-**-*       N-**            N-           0',   /*                   00017100
                                                                                   */00017200
/***  ***  ***  ***  ***  ***  ***  ***  ***  ***  ***  ***  ***  ***  *            00017300
*                                                                   *              00017400
*                RESPON -- QUALITY                                  *              00017500
*                                                                   *              00017600
*   THE FOLLOWING ROWS DEAL WITH DATA QUALITY AND ADVICE            *              00017700
*                                                                   *              00017800
***  ***  ***  ***  ***  ***  ***  ***  ***  ***  ***  ***  ***  ***  *            00017900
                                                                                   */00018000
          '*****-**-D       *-N*            -W           4',   /*                   00018100
          R.N. RECEIVED NEW DATA.  O.N. NOW HAS WORSE.                              00018200
                                                                                   */00018300
          '*****-B*-*       *-N*            -W           4',   /*                   00018400
          R.N. RECEIVED ADVICE.    O.N. NOW HAS WORSE.                              00018500
                                                                                   */00018600
          'E N D                                                '  /*               00018700
          *THIS ENTRY IDENTIFIES THE END OF THIS TABLE*                         00018800
                                                                                   */00018900
          );                                                                        00019000
```

TABLE 6

```
DCL RESPRN CHAR INIT(                                                              00019100
/**********************************************************************   00019200
 *                                                                     *   00019300
 *                     RESPRN                                          *   00019400
 *                                                                     *   00019500
 *                                                                     *   00019600
 *************** INPUT **************  ************ OUTPUT *********** *   00019700
 *                                  *                                  *   00019800
 *                                  *                                  *   00019900
 *                                  *                  RETURN CODE ---,*   00020000
 *                                  *                                 |*   00020100
 *                                  *                                 |*   00020200
 *      REQUEST    R.N.     T.N.    *               NEW T.N.          |*   00020300
 *      FROM       DIPOL    DIPOL   *  RESPONSE     DIPOL             |*   00020400
 *      R.N.       1/2      1/2     *  TO R.N.      1/2               |*   00020500
 *                                  *                                  *   00020600
 *      EUSPN-QR-D C-QR     C-QR    *  EUSPN-QR-D   C-QR               *   00020700
 *                                  *                                  *   00020800
                                                                       */  00020900
/*** *** *** *** *** *** *** *** *** *** *** *** *** *** *** *** *** *     00021000
 *                                                                     *   00021100
 *                  RESPRN -- QUALITY                                  *   00021200
 *                                                                     *   00021300
 *   THE FOLLOWING ROWS DEAL WITH DATA TRANSFER CNTL -- QUALITY        *   00021400
 *                                                                     *   00021500
 *** *** *** *** *** *** *** *** *** *** *** *** *** *** *** *** *** *     00021600
                                                                       */  00021700
/* R.N. WANTS TO MAINTAIN SAME DATA QUALITY AS THIS NODE.              */  00021800
   '*****-N*-N  *-N*    *-N*            -N -N -N      0',  /*              00021900
   BOTH R.N. AND T.N. HAVE SAME DATA.                                      00022000

*/  00022100
   '*****-N*-N  *-N*    *-W*            -N -D -N      2',  /*              00022200
   T.N. HAS BETTER DATA. R.N. IS UNINFORMED.  SEND IT TO R.N.              00022300
                                                                       */  00022400
   '*****-N*-N  *-A*    *-B*            -N -N -B      4',  /*              00022500
   R.N. HAS BETTER DATA. ASK FOR IT.                                       00022600
                                                                       */  00022700
   '*****-N*-N  *-B*    *-A*            -N -D -N      2',  /*              00022800
   R.N. REQUESTS DATA AFTER ADVICE.  SEND IT.                              00022900
                                                                       */  00023000
/* R.N. IS SENDING DATA TO T.N.                                         */ 00023100
   '*****-N*-D  *-N*    *-N*            -N -N -N      0',  /*              00023200
   T.N. WAS UNAWARE OF BETTER DATA.                                        00023300
                                                                       */  00023400
   '*****-N*-D  *-N*    *-B*            -N -N -N      0',  /*              00023500
   T.N. HAD BEEN ADVISED OF BETTER DATA.                                   00023600
                                                                       */  00023700
/* R.N. IS ADVISING T.N. OF BETTER DATA.                                */ 00023800
   '*****-B*-N  *-A*    *-N*            -A -N -B      0',  /*              00023900
   RECORD R.N. BETTER DATA.                                                00024000
                                                                       */  00024100
   '*****-B*-N  *-A*    *-B*            -A -N -B      0',  /*              00024200
   THIS IS DUPLICATE ADVICE.                                               00024300
                                                                       */  00024400
/* THE FOLLOWING LOOK LIKE ADVICE FROM R.N. BUT ONLY OCCUR AS           */  00024500
/* PART OF REPLICA EXPUNGE PROCESSING.                                  */  00024600
   '*****-B*-N  *-N*    *-N*            -A -N -B      2',  /*              00024700
   BOTH R.N. AND T.N. HAVE SAME DATA.                                      00024800
                                                                       */  00024900
   '*****-B*-N  *-N*    *-W*            -A -D -B      2',  /*              00025000
   T.N. HAS BETTER DATA.  SEND IT.                                         00025100
                                                                       */  00025200
   '*****-B*-N  *-B*    *-A*            -A -D -B      2',  /*              00025300
   T.N. HAS BETTER DATA.  SEND IT.                                         00025400
                                                                       */  00025500
   '*****-B*-N  *-W*    *-N*            -A -N -B      2',  /*              00025600
   T.N. HAS WORSE DATA.                                                    00025700
                                                                       */  00025800
/* R.N. IS SEEKING ADVICE                                               */  00025900
   '*****-A*-N  *-N*    *-N*            -N -N -N      2',  /*              00026000
   R.N. SEEKS ADVICE.  T.N. HAS SAME DATA.                                 00026100
```

TABLE 6

```
                                                                         */00026200
       '*****-A*-N *-N*    *-W*         -B -N  -A       2',   /*           00026300
       R.N. SEEKS ADVICE.   T.N. HAS BETTER DATA.   ADVISE R.N.             00026400
                                                                         */00026500
/* R.N. IS ACKNOWLEDGING ADVICE FROM T.N.                                */00026600
       '*****-A*-N *-B*    *-A*         -B -N  -A       0',   /*           00026700
       R.N. WAS ADVISED.   ACCEPT ACKNOWLEDGEMENT.                          00026800
                                                                         */00026900
/* THE FOLLOWING LOOK LIKE ACKNOWLEDGEMENTS FROM R.N. BUT ONLY           */00027000
/* OCCUR AS PART OF REPLICA EXPUNGE PROCESSING.                          */00027100
       '*****-A*-N *-B*    *-N*         -B -N  -A       0',   /*           00027200
       R.N. HAD SAME DATA.   ACCEPT ACKNOWLEDGEMENT.                        00027300
                                                                         */00027400
       '*****-A*-D *-B*    *-N*         -B -N  -A       0',   /*           00027500

R.N. HAD BETTER DATA.   ACCEPT DATA AND ACKNOWLEDGEMENT.             00027600
                                                                         */00027700
       '*****-A*-D *-B*    *-B*         -B -N  -A       0',   /*           00027800
       R.N. HAD BETTER DATA.   ACCEPT DATA AND ACKNOWLEDGEMENT.             00027900
                                                                         */00028000
/*** *** *** *** *** *** *** *** *** *** *** *** *** *** *** *** *** *    00028100
 *                                                                    *    00028200
 *                  RESPRN -- RESPONSIBILITY                          *    00028300
 *                                                                    *    00028400
 *   THE FOLLOWING ROWS DEAL WITH DATA TRANSFER CNTL -- RESPONSIB.    *    00028500
 *                                                                    *    00028600
*** *** *** *** *** *** *** *** *** *** *** *** *** *** *** *** *** *    00028700
                                                                         */00028800
/* R.N. WANTS TO GIVE UP ITS CURRENT RESPONSIBILITY.                     */00028900
       '*****-*N-* *-*Y    *-**         -Y-  -N         2',   /*           00029000
       OK.   TEMPORARILY, NEITHER HAS RESPONSIBILITY.                       00029100
                                                                         */00029200
       '*****-*N-* *-*Y    *-**         -Y-  -N         0',   /*           00029300
       R.N. HAS GIVEN UP RESPONSIBILITY.   ACCEPT REQUEST NO                00029400
       MATTER WHAT CURRENT RESPONSIBILITY.                                  00029500
                                                                         */00029600
       '*****-*N-* *-*B    *-*B          -Y-  -N        2',   /*           00029700
       OK.   CURRENTLY HAVE JOINT RESPONSIBILITY.                           00029800
                                                                         */00029900
/* R.N. WANTS TO HAVE SOLE RESPONSIBILITY.                               */00030000
       '*****-*Y-* *-*N    *-**         -N-  -Y         0',   /*           00030100
       O.K.   R.N. ALREADY ASSUMES NO RESPONSIBILITY FOR T.N.               00030200
       ACCEPT REQUEST NO MATTER WHAT IS CURRENT RESPONSIBILITY.             00030300
                                                                         */00030400
       '*****-*Y-* *-*Y    *-*N         -N-  -Y         2',   /*           00030500
       T.N. HAS SOLE RESPONSIBILITY.   REVERSE RESPONSIBILITY.              00030600
                                                                         */00030700
       '*****-*Y-* *-*B    *-*B         -N-  -Y         2',   /*           00030800
       NOW HAVE JOINT RESPONSIBILITY.   T.N. GIVES UP RESPONSIBILITY.       00030900
                                                                         */00031000
/* R.N. WANTS JOINT RESPONSIBILITY WITH THIS NODE.                       */00031100
       '*****-*E-* *-*N    *-*Y         -B-  -B         2',   /*           00031200
       T.N. ACCEPTS JOINT RESPONSIBILITY.                                   00031300
                                                                         */00031400
       '*****-*B-* *-*Y    *-*N         -B-  -B         2',   /*           00031500
       R.N. MUST NOW ACCEPT JOINT RESPONSIBILITY.                           00031600
                                                                         */00031700
       '*****-*B-* *-*B    *-**         -B-  -B         0',   /*           00031800
       JOINT RESPONSIBILITY ACCEPTED NO MATTER WHAT CURRENT STATE.          00031900
                                                                         */00032000
/*** *** *** *** *** *** *** *** *** *** *** *** *** *** *** *** *** *    00032100
 *                                                                    *    00032200
 *                   RESPRN -- CURRENCY                               *    00032300
 *                                                                    *    00032400
 *   THE FOLLOWING ROWS DEAL WITH COMPUTING THE CURRENCY              *    00032500
 *   CONTROL FOR THE NEW STATE AND THE RESPONSE.                      *    00032600
 *   WHEN THE REQUEST OFFERS A    CHOICE OF DESIRED CURRENCY          *    00032700
 *   CONTROLS, THEN THE MINIMUM CURRENCY IS SELECTED.                 *    00032800
 *                                                                    *    00032900
*** *** *** *** *** *** *** *** *** *** *** *** *** *** *** *** *** *    00033000

*/00033100
/* R.N. WANTS CURRENCY CONTROL OF NOT ACCESSIBLE.                        */00033200
       '****N-**-* N-**    E-**         E....-  -N      2',   /*           00033300
```

TABLE 6

```
                R.N. MUST REDUCE ITS CURRENCY NEXT.                              00033400
                                                                               */00033500
      '*****N-**-* P-**    U-**     E....-  -  N-         2',    /*   00033600
                R.N. MUST REDUCE ITS CURRENCY NEXT.                              00033700
                                                                               */00033800
      '*****N-**-* S-**    S-**     E....-  -  N-         2',    /*   00033900
                R.N. MUST REDUCE ITS CURRENCY NEXT.                              00034000
                                                                               */00034100
      '*****N-**-* U-**    P-**     E....-  -  N-         2',    /*   00034200
                R.N. MUST REDUCE ITS CURRENCY NEXT.                              00034300
                                                                               */00034400
      '*****N-**-* E-**    *-**     E....-  -  N-         0',    /*   00034500
                ACCEPT REQUEST FOR NOT ACCESSIBL NO MATTER WHAT CURRENT STATE.00034600
                                                                               */00034700
/* R.N. WANTS CURRENCY CONTROL OF PRIOR                                        */00034800
      '****P.-**-* N-**    E-**     .U...-  -  P-         2',    /*   00034900
                R.N. MUST REDUCE ITS CURRENCY NEXT.                              00035000
                                                                               */00035100
      '****P.-**-* P-**    U-**     .U...-  -  P-         2',    /*   00035200
                R.N. MUST REDUCE ITS CURRENCY NEXT.                              00035300
                                                                               */00035400
      '****P.-**-* S-**    S-**     .U...-  -  P-         2',    /*   00035500
                R.N. MUST REDUCE ITS CURRENCY NEXT.                              00035600
                                                                               */00035700
      '****P.-**-* U-**    *-**     .U...-  -  P-         0',    /*   00035800
                ACCEPT REQUEST FOR PRIOR NO MATTER WHAT CURRENT STATE.           00035900
                                                                               */00036000
      '****P.-**-* E-**    N-**     .U...-  -  P-         2',    /*   00036100
                R.N. REQUESTS EXTEND FROM NOT ACCESSIBLE TO PRIOR.               00036200
                                                                               */00036300
/* R.N. WANTS CURRENCY CONTROL OF SHARED CLEAN.                                */00036400
      'S..--* N-    E-     ..S..-  -  S-         2',    /*   00036500
                R.N. MUST REDUCE ITS CURRENCY NEXT.                              00036600
                                                                               */00036700
      'S..--* P-    U-     ..S..-  -  S-         2',    /*   00036800
                R.N. MUST REDUCE ITS CURRENCY NEXT.                              00036900
                                                                               */00037000
      'S..--* S-**    *-**     ..S..-  -  S-         0',    /*   00037100
                ACCEPT REQUEST FOR SHARED CLEAN NO MATTER WHAT CURRENT STATE.    00037200
                                                                               */00037300
      'S..--* U-    P-     ..S..-  -  S-         2',    /*   00037400
                R.N. HAS PRIOR NOW.  EXTEND DESIRED CURRENCY CONTROL.            00037500
                                                                               */00037600
      'S..--* E-    N-     ..S..-  -  S-         2',    /*   00037700
                R.N. HAS NOT ACCESSIBLE NOW.  EXTEND DESIRED CURRENCY CONTROL.00037800
                                                                               */00037900
/* R.N. WANTS CURRENCY CONTROL OF UNIQUE CLEAN.                                */00038000
      '*U...-**-* N-**    E-**     ...P.-  -  U-         2',    /*   00038100
                R.N. MUST REDUCE ITS CURRENCY NEXT.                              00038200
                                                                               */00038300
      '*U...-**-* P-**    *-**     ...P.-  -  U-         0',    /*   00038400
                ACCEPT REQUEST FOR UNIQ CLEAN NO MATTER WHAT CURRENT STATE.      00038500
                                                                               */00038600
      '*U...-**-* S-**    S-**     ...P.-  -  U-         2',    /*   00038700
                R.N. REQUEST EXTEND FROM SHARED CLEAN TO UNIQUE CLEAN.           00038800
                                                                               */00038900
      '*U...-**-* U-**    P-**     ...P.-  -  U-         2',    /*   00039000
                R.N. REQUEST EXTEND FROM PRIOR TO UNIQUE CLEAN.                  00039100
                                                                               */00039200
      '*U...-**-* E-**    N-**     ...P.-  -  U-         2',    /*   00039300
                R.N. REQUEST EXTEND FROM NOT ACCESSIBLE TO UNIQUE CLEAN.         00039400
                                                                               */00039500
/* R.N. WANTS CURRENCY CONTROL OF EXCLUSIVE.                                   */00039600
      'E....-**-* N-**    *-**     ....N-  -  E-         0',    /*   00039700
                ACCEPT REQUEST FOR EXCLUSIVE NO MATTER WHAT CURRENT STATE.       00039800
                                                                               */00039900
      'E....-**-* P-**    U-**     ....N-  -  E-         2',    /*   00040000
                R.N. REQUESTS EXTEND FROM UNIQUE CLEAN  TO EXCLUSIVE.            00040100
                                                                               */00040200
      'E....-**-* S-**    S-**     ....N-  -  E-         2',    /*   00040300
                R.N. REQUESTS EXTEND FROM SHARED CLEAN  TO EXCLUSIVE.            00040400
                                                                               */00040500
      'E....-**-* U-**    P-**     ....N-  -  E-         2',    /*   00040600
```

TABLE 6

```
R.N. REQUESTS EXTEND FROM PRIOR TO EXCLUSIVE.          00040700
                                                     */00040800
'F....-**-* E-**    N-**    ....N-    - E-   2',  /*  00040900
   R.N. REQUESTS EXTEND FROM NOT ACCESSIBLE TO EXCLUSIVE.  00041000
                                                     */00041100
/* *** NEXT ENTRY IDENTIFIES THE END OF THIS TABLE ***  */00041200
 'E N D                                             *  00041300
     ) ;                                                00041400
```

The return codes 268 from RESPON 88 are as follows:
- 0—No change to dipole half 256 for other node 240.
- 4—Change to dipole half 256 required, as in new dipole half 266.

The possible return codes 292 from RESPRN 90 are:
- 0—No need to build response quark.
- 2—Build response quark with RDI 294=0
- 4—Build response quark with RDI 294=1

Referring now to FIG. 1 in connection with FIGS. 4 and 5, some examples of the process of the invention for utilizing data storage resources 36, 38, 40 and communication resources 16, 18, 66, 68, 70 among competing application programs 24, 26, 28 in a multiprocessing, multiprogramming environment including nodes 10, 12, 14 will be described.

Once data is stored in the data file 36, it normally stays there until the space is needed for some other data item. It is thus available for satisfying subsequent data calls without further network interactions. This contrasts with partitioned data base schemes where data must be re-retrieved for each subsequent request.

When a data call 202 received from an application 26 requires a data item with key 216 to be sent from some other node, there must be room available in data file 38 to store it. A utility is required to be run from time to time which will issue one or more relinquish utility calls. These relinquish utility calls will be processed according to FIG. 6 to possibly effect dipole half changes at other nodes reflecting the change in state (deletion of record from data file 36) at transaction node 12. The fields 238C, 238Q, 238R, in SAC file 62 may be used by the utility to select the record to be expunged from data file 38. Data for record of key L stored in data file 36 may be expunged therefrom whenever the SAC file 60 entry therefore comprises the dipole half [10 L * E-BY], where * in the other node ID designates "don't care". In this manner, room in data file 38 is made available to receive data from other nodes 10, 14, . . . , when required to satisfy future requests for data from applications 26.

Several examples of data base access request processing will next be described using the data base illustrated in Table 7 which describes the initial contents of the data files 36, 38, 40 and SAC files 60, 62, 64 at each of nodes 10, 12, and 14.

TABLE 7

| | | Initial File Conditions (Example) | | | | | | |
|---|---|---|---|---|---|---|---|---|
| | | SAC File Information | | | | | Data File Information | |
| Node | | | Re- | Dipole Half | | | | |
| This Node 276 | SAC File 206 | Data Key 236 | lated Node 240 | Cur- rency 238C | Qual/ Resp. 238QR | | Data File | Data Key 236 | Data Val- ue |
| 10 | 60 | A | 12 | S | — | N B | 36 | A | 100 |
| | | J | 12 | U | — | N Y | | J | 200 |
| | | Else | 12 | E | — | B Y | | | |
| 12 | 62 | A | 10 | S | — | N B | 38 | A | 100 |

-continued

| | | Initial File Conditions (Example) | | | | | | |
|---|---|---|---|---|---|---|---|---|
| | | SAC File Information | | | | | Data File Information | |
| Node | | | Re- | Dipole Half | | | | |
| This Node 276 | SAC File 206 | Data Key 236 | lated Node 240 | Cur- rency 238C | Qual/ Resp. 238QR | | Data File | Data Key 236 | Data Val- ue |
| | | A | 14 | S | — | N B | | J | 200 |
| | | J | 10 | P | — | N N | | K | 300 |
| | | J | 14 | U | — | N Y | | S | 400 |
| | | K | 14 | P | — | N N | | | |
| | | Else | Any | N | — | A N | | | |
| 14 | 64 | A | 12 | S | — | N B | 40 | A | 100 |
| | | J | 12 | P | — | W N | | J | 250 |
| | | K | 12 | U | — | N Y | | K | 300 |
| | | Else | 12 | E | — | B Y | | | |

Initially, data file 38 at node 12 contains four records having keys A, J, K, S and having values 100, 200, 300 and 400 respectively. Node 10 has replicas of records A and J in data file 36. Node 14 has replicas in data file 40 of records A, J, and K; however, the value of record J has been modified to equal 250 at node 14.

EXAMPLE 1: SHARED CLEAN DATA

The ability to share CLEAN data among nodes is illustrated with record A. SAC File 62 at node 12 contains dipole halves [12 A 10 S-NB] and [12 A 14 S-NB] (fields 236, 240, 238, respectively, concatenated with this node 12 designation for purpose of clarity in the explanation of these examples) revealing that node 12 understands that both nodes 10 and 14 have copies of record A which each is assuming to be CLEAN. This is shown as a currency control status S (shared clean) in Table 7. If CLEAN data is shared, then none of nodes 10, 12, 14 can modify the data (A=100) without first getting the other nodes to change their halves of the dipole.

A dipole describes the relationship between two nodes for a data item. Each of those nodes may have additional relationships for the same data item with other nodes as long as the additional relationships do not conflict. For example, node 10 is aware that it is sharing CLEAN data with node 12 [10 A 12 S-NB] but is unaware that node 12 has also shared the record with node 14.

An application 24 desiring to read record A at node 10 would issue a DL/1 call 212, 226 Get Unique clean (GU-C) specifying the key 216 (A) of the record to be read. In Step 1.1, below, this call is converted into a request quark 84 specifying what view this node (TN 276=10) is to have of the status of data record A after the request has been processed. For this example, following the format of FIG. 7, the request quark 84 will be as follows:

Step 1.1 Request quark 84: [A 10 10 EUS. .-NB-N 0-00*] where the 0-00 entry in field 232 designates an imperative, and will be processed irrespective of current status, and the currency control set EUS. . is obtained from PIDR 204 for call 226 of GU-C.

Upon receipt of request quark 84 from Step 1.1, data distribution manager 48 searches SAC file 60, 206 to identify all dipole halves 238 for data item A, and in Step 1.2 generates for each other node 240 sharing data item A an input argument 208 for processing through CONFON 86. In this example, the input arguments are as follows, one for the single instance of Key 236=A in SAC File 60, 206:

Step 1.2 CONFON 86 input 208: [EUS. .-NB-N S-NB]

The result of processing CONFON input from Step 1.2 through CONFON 86 in Step 1.3 is CONFON output 210, as follows:

Step 1.3 CONFON output 210: [EUS. .-NB-N 0]

The return code field 334 of "0" indicates that there was no conflict between the related node request 338 and other node dipole half 258. Consequently, processing passes to data base manager 54 which accesses data file 36 to read record A, passing the value thereof to application program 24. No change is required to SAC file 60.

EXAMPLE 2: UPDATES AND PRIOR DATA

A dipole situation in which updates can be taking place is shown for record J. The dipole half for record J at node 10 is [10 J 12 U-NY]. This shows that in the view of node 10, node 12 has a UNIQUE CLEAN replica of record J. This tells node 10 that node 12, or some node related to node 12, may be making updates to record J. Thus, node 10 must assume that its replica of record J in data file 36 contains PRIOR data. Update activity cannot be permitted at node 10 unless a change to the dipole is negotiated with node 12.

However, in the view of node 12, node 14 has a UNIQUE CLEAN replica of record J as is shown by Table 7 dipole half [12 J 14 U-NY]. Node 14 has, in fact, already modified record J, which has a value of 250 only at node 14, and 200 elsewhere, but has not yet advised node 12 that it has worse data, as is shown by the quality control value W in dipole half [14 J 12 P-WN].

If application program 24 attempts to read record J at node 10 by issuing DL/1 call 212 Get Unique, then the access request will be passed to data base manager 54 without network interaction only if the application has indicated that it will accept PRIOR data by issuing a call 212 of GU-P. In Step 2.1, DDM 48 prepares request quark 84, as follows:

Step 2.1 Request quark 84: [J 10 10 EUSP.-NN-N 0-00 *]

Quark 84 is used to generate a search of SAC file 60 for dipole halves related to key J, and for the single instance thereof, an input 208 to CONFON 86 is generated by Step 2.2:

Step 2.2 CONFON input 208: [EUSP.-NN-N U-NY]

In Step 2.3, input 208 is processed through CONFON 86, to give output 210:

Step 2.3 CONFON output 210: [EUSP.-NN-N 0]

Where the return code of "0" in CONFON output 210 indicates that there is no conflict between the request 338 and the other node dipole half 258. With no conflicts identified by Step 2.3, the request is granted and the data call is passed to data base manager 54 which returns the prior data value of 200 (there being a more recent value of 250 at node 14). There is no network interaction with nodes 12 or 14 in satisfying this request.

EXAMPLE 3: OBTAINING CLEAN DATA

Referring to FIGS. 5 and 7, assume for this example that application 24 issues a retrieval call 202 for record K and requires CLEAN currency. In DL/1, this would be a GU-C call 212, which in Step 3.1 is processed into the following request quark 100 (84):

Step 3.1 Request Quark 100: [K 10 10 EUS. .-NB-N 0-00 *]

A search of SAC file 60 (Table 7) on key K reveals that node 10 does not have a specific dipole half for record K for any other node. However, the last dipole half in SAC file 60 indicates that all records which are not otherwise described by dipole halves are assumed to be held exclusively at node 12: dipole half [10 ELSE 12 E-BY]. Consequently, the input 208 to CONFON 106 (86) generated in Step 3.2 is as follows:

Step 3.2 CONFON input 208: [EUS. .-NB-N E-BY]

In Step 3.3, CONFON 106 is executed. The output 210 will have a return code 334 of 4, indicating a conflict must be resolved. Node 10 will go into wait state 138 pending the response.

Step 3.3 CONFON output 210: [EUS. .-NB-N 4]

By way of further illustration, and by reference to Table 4 (CONFON), the detailed derivation of CONFON output 210 in Step 3.3. from the input 208 of Step 3.2 is as follows:

Step 3.2 input 208: [EUS. .-NB-N E-BY]

| Row | Input Section | Output Section |
|---|---|---|
| 3200 | ***__*E_** | ....N— — 0 |
| 5100 | ***__* *_*Y | — Y— 0 |
| 5800 | ***__* *_** | —N —N 0 |
| 7400 | ***__* *_B* | —N —N 4 |
| 9100 | S..—_* E—** | EUS..— B— 4 |
| 11800 | END | |

Step 3.3 output 210: [EUS. .-NB-N 4]

In Step 3.4 an outgoing conflict quark 104 (92) is packaged in a message 105 from source node 10 to destination node 12 with the source reflection ID 76 set to a value which will identify process 102 at source node 10. The destination reflection ID 78 is set to zero.

Step 3.4 Outgoing Conflict Quark 104 (92) from Node 10 to Node 12: [K 10 12 EUS. .-NB-N-E-BY 1]

In step 3.5 the outgoing conflict quark of Step 3.4 becomes a request quark 108 (84).

Step 3.5 Request Quark 108 received at Node 12 from Node 10: [K 12 10 EUS. .-NB-N E-BY 1]

Step 3.6 CONFON 86 input 208: [EUS. .-NB-N P-NN]

Where the dipole half [P-NN] is derived from dipole half entry [12 K 14 P-NN] in SAC file 62.

Step 3.7 CONFON 124 (86) output 210: [.U. . .-NY-N 0 ]

Which is derived as follows from CONFON (Table 4):

Step 3.6 input 208: [EUS. .-NB-N P-NN]

| Row | Input Section | Output Section |
|---|---|---|
| 4100 | ***__* P_** | .U...— — 0 |
| 4800 | ***__* *_*N | — Y— 0 |
| 5800 | ***__* *_** | —N —N 0 |
| 11800 | END | |

Step 3.7 output 210: [.U. . .-NY-N 0]

The return code of 0 in output 210 indicates that no conflict was observed, as node 14 is assuming that its copy of record K is prior, and therefore cannot be making updates to record K.

Step 3.8 RESPON 130 (88) input 326: [EUS. .-NB-N P-NN]

Where P-NN is the dipole half in SAC file 62 at node 12 for node 14.

Step 3.9 RESPON 130 (88) output 330: [P- N O]

Which is derived as follows from RESPON (Table 5):

Step 3.8 input 326: [EUS. .-NB-N P-NN]

| Row | Input Section | Output Section |
|---|---|---|
| 15100 | ***——* *—*N | — N 0 |
| 16900 | ***——* P—** | P— 0 |
| 18700 | END | |

Step 3.9 output 330: [P- N O]

The return code of 0 indicates that no changes to the dipole half at node 12 for node 14 are required.

Step 3.10 RESPRN 134 (90) input 328: [EUS. .-NB-N E-BY N-AN]

Where N-AN is the last dipole half in SAC file 62 at node 12 and indicates that any other node is assumed to not be holding records not otherwise described by dipole halves.

Step 3.11 RESPRN 134 (90) output 332: [. .S. .-NB-D S-NB 2]

Which is derived as follows from RESPRN (Table 6): Step 3.10 input 328: [EUS. .-NB-N E-BY N-AN]

| Row | Input Section | Output Section |
|---|---|---|
| 22800 | *****—N*—N *—B* *—A* | —N —D —N 2 |
| 31500 | *****—*B—* *—*Y *—*N | — B— — B 2 |
| 37700 | S..——* E—** N—** | ..S.— — S— 2 |
| 41300 | END | |

Step 3.11 output 332: [. .S. .-NB-D S-NB 2]

The return code of 2 indicates that a response quark 116 (96) to node 10 must be built with RDI 294 set to zero.

Since the new dipole half 264 at TN 12 for RN 10 differs from the current dipole half 254, the dipole half 238 stored in the SAC file 62,206 must be replaced by the new value.

Step 3.12 outgoing response quark 116 (96), which is packaged with data into message 118 from source node 12 to destination node 10. Source reflection ID 76 is set to zero and destination reflection ID 78 is copied from the source reflection ID contained in the message containing request quark 84 at Step 3.5. Record K from data file 38 at node 12 is included with response quark 116 (96) as indicated by the value D in the data accompanies portion 286D of the requested dipole half 286.

In Step 3.13, a message 118 (72) containing request quark 120 (84) and data 80 (record K) is received at node 10 from node 12.

Step 3.13 Request Quark 120 (84) received at node 12: [K 10 12 . .S. .-NB-D S-NB 0]

Record K in the data portion of message 118 is inserted into data file 36 at node 10 as indicated by the value D in the data accompanies portion of the requested dipole half 280D.

Step 3.14: No CONFON 126 (86) or RESPON 132 (88) processing occur at node 10 since there are no other related nodes for record K.

Step 3.15 RESPRN 136 (90) input 328: [. .S. .-NB-D S-NB E-BY ]

Step 3.16 RESPRN 136 (90) output 332: [. .S. .-NB-N S-NB 0]

Output 332 is derived as follows from RESPRN (Table 5):

Step 3.15 input 328: [. .S. .-NB-D S-NB E-BY]

| Row | Input Section | Output Section |
|---|---|---|
| 23500 | *****—N*—D *—N* *—B* | —N —N —N 0 |
| 31800 | *****—*B—* *—B* *—** | — B— — B 0 |
| 37100 | S..——* S—** *—** | ..S..— — S – 0 |
| 41300 | END | |

Step 3.16 output 332: [. .S. .-NB-N S-NB 0]

Step 3.17: Since the return code 292 has the value 0 and since RDI 290 in request quark 120 (84) is zero, it is not necessary to build a response quark 96 and send it back to node 12. Since the RN request 350 part of RESPRN input 328 indicates that data accompanies this request, the data in the message 118 is stored in data file 36.

Step 3.18: The successful completion of RESPRN 136 (90) is signaled to wait function 138 in process 102, 82 at node 10 using the destination reflection ID 78 in the message 118 containing request quark 120 (84) (Step 3.13).

Step 3.19: Since process 102 is waiting on only this one event, processing continues.

Node 10 now holds a clean copy of record K in its data file 36 which fact is represented by the two dipole halves in SAC file 60 at node 10 and SAC file 62 at node 12.

Step 3.20 RESPON 128 (88) input 326: [EUS. .-NB-N S-NB]

Where S-NB is the dipole half in SAC file 60 at node 10 for node 12.

Step 3.21 RESPON 128 (88) output 330: [S- B O]

Which is derived as follows from RESPON (Table 5):

Step 3.20 input 326: [EUS. .-NB-N S-NB]

| Row | Input Section | Output Section |
|---|---|---|
| 15300 | ***——* *—*B | — B 0 |
| 16700 | ***——* S—** | S— 0 |
| 18700 | END | |

Step 3.21 output 330: [S- B O]

The return code of 0 indicates that no changes to the dipole half at node 10 for node 12 are required. The application call 202 can now be passed to DL/I 48 at node 10 and the results returned to application 24.

We claim:

1. A method for operating a computing apparatus having a plurality of nodes, each node having storage means for storing a plurality of data items and means responsive to a request for accessing a specified data item, and communication means interconnecting selected nodes, the method including the steps of controlling access to the specified data item and controlling the modification of copies of the data item, characterized by the steps of:

distributing data access control to each node of the apparatus; and, responsive to a request having a specified currency, dynamically replicating data items while selectively deferring conformation of the replicated data;

such that the most current data items migrate to their respective affinity nodes.

2. The method of claim 1, wherein said replicating step is further characterized by:
selectively updating a data item at a request processing node in connection with the processing of a request at said request processing node while selectively deferring conformation of copies of the updated data item at other nodes.

3. A method for operating a computing system including a plurality of nodes, with each node having means for storing at least one data item, comprising the steps of:
responsive to a request having a specified currency, dynamically replicating data under distributed system control, while
selectively deferring conformation of the replicated data.

4. A method for operating a computing apparatus to dynamically replicate data under distributed system control comprising the steps of:
storing a data item at each of two nodes;
storing at each of the nodes a dipole half for said date item, the dipole half stored at a first node describing the status of the data item at the second node assumed by said first node;
responsive to a request for access to said data item at said first node, (1) determining from the dipole half stored at said first node if the status at the second node assumed by the first node is in conflict with the request, (2) if in conflict, resolving the conflict by communicating with said second node, and (3) when the conflict is resolved, granting the request for access.

5. A method for operating a computing apparatus including a plurality of nodes, with each node having means for storing at least one data item and means responsive to a request for accessing a specified data item, and communication means interconnecting selected nodes, the computing apparatus being operated in response to a request for accessing a specified data item and controlling the modification of copies of the data item at a plurality of nodes, the method characterized by the steps of:
generating a data request specifying a required currency for a specific data item at the node of the request;
determining if the node of the request views any other node as having for said specific data item a currency status which is in conflict with said required currency;
resolving currency conflicts; and thereafter
granting the request for accessing the specified data item.

6. A method for operating a first node of a multinode computing apparatus, said first node including means for storing at least one data item, means responsive to a request for accessing a specified data item, and a port for communicating data and control signals with respect to at least one other node, said first node being operated in response to a request for accessing a specified data item and controlling the modification of copies of data items at said first node, the method characterized by the steps of:
generating a data request specifying a required currency for a specific data item at said first node;
determining if said first node views any other node as having for said specific data item a currency status which is in conflict with said required currency;
communicating a message containing a data request to other nodes and receiving from each such other node a response resolving any currency conflicts; and thereafter
granting the request for access to the specified data item.

7. The method of claim 6, further characterized by the steps of:
storing or enabling generation of a set of dipole halves at said first node, with a dipole half in said set for each other node with which said first node shares a data item; each such dipole half specifying the status assumed by said first node for the shared data item at the other node.

8. The method of claim 7, further characterized by the step of:
specifying in each such dipole half the currency control, quality control, and responsibility control assumed by said first node for the shared data item at an other node; wherein said currency control describes the currency of the contents of the shared data item at said other node assumed by said first node and is established as one of exclusive, unique clean, shared clean, prior, or not accessible; wherein said quality control defines the relative quality of the shared data item at said first node and at or through said other node; and wherein said responsibility control specifies whether said other node has agreed to always be able to obtain a copy of said shared data item at the currency given by said currency control on behalf of said first node.

9. A method for operating a node of a computing system, said node including means for storing at least one data item and control information for use in controlling access to such data item, and a port for communicating data and control signals with respect to at least one other node, the method characterized by the steps of:
responsive to a request specifying a required currency for a specific data item at said node, determining if said node views any other node as having for said spcific data item a currency status which is in conflict with said required currency; and
for each such currency conflict, generating a message containing a data request to resolve the conflict for communication to the other node.

10. The method of claim 9, further characterized by the steps of:
responsive to a request for access to a data item, generating a request quark specifying the currency control set, quality control and responsibility control required by the said request; and
storing at said node in a status and control file for each data item stored at said node a set of dipole halves, with one dipole half in said set for each other node with which said node shares such data item, each such dipole half specifying the status of the shared data item at the other node assumed by said node.

11. A method for operating a first node of a computing system, said first node including means for storing at least one data item, means responsive to a request for accessing a specified data item, and a port for communicating data and control signals with respect to at least one other node, said first node being operated in response to the request for accessing the specified data item and controlling the modification of copies of data items at said first node, the method characterized by the steps of:

storing or enabling generation of a set of dipole halves at said first node, with a dipole half for each other node with which said node shares a data item;

responsive to a request quark specifying for a given data item the dipole half desired at said first node by a related node and the dipole half at the related node for said first node, executing a quark processing unit comprising the following steps:

determining if any dipole halves stored at said first node for said given data item have a conflicting status;

generating a conflict quark for each dipole half having a conflicting status for communication to the other node having the conflicting status;

waiting for a response to each communicated conflict quark;

modifying dipole halves stored at said first node for other nodes as required to reflect processing of said request quark, and modifying the dipole half at said first node for said related node as required to reflect processing of said request quark; and selectively generating a response quark or otherwise responding to the originator of said request quark.

12. A method for operating a computing system including a plurality of nodes interconnected by a communication network; each node storing in a data file a plurality of data items which may be unique or copies of data items stored at other nodes; each node, responsive to a request for access to a specified data item by an application, controlling the applications's access to said stored data item; and each node selectively communicating the updated data item to other nodes storing copies of the specified dta item; wherein improvements to the controlling, storing, and communicating steps provide dynamic replication of data under distributed system control and comprise the steps of:

storing a dipole with respect to a data item shared by a node pair, a dipole half being stored in each node of the node pair specifying the status, assumed by this node, of the shared data item at a related node, with the data state of a given data item at this node being defined by the set of dipole halves stored at this node with respect to all related nodes sharing copies of that given data item;

responsive to a request for access to a data item from an application at this node having a copy of the data item at a data state consistent with the request, granting the request without network interaction with related nodes;

responsive to a request for access to a data item from an application at this node having a data state conflict with the request, negotiating a dipole change with each related node with which this node receiving the access request shares a conflicting dipole, and upon resolution of all such conflicts, granting the request; and responsive to an update request which has been granted, storing the updated data item at this node and only thereafter in connection with an application request communicating from some other node, or in the course of data base conformation processing, communicating the updated item to that other node.

* * * * *